United States Patent
Buch et al.

(10) Patent No.: US 7,911,724 B2
(45) Date of Patent: Mar. 22, 2011

(54) WRITE SYNCHRONIZATION PHASE CALIBRATION FOR STORAGE MEDIA

(75) Inventors: Bruce Douglas Buch, Westborough, MA (US); Mathew P. Vea, Shrewsbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 180 days.

(21) Appl. No.: 12/475,001

(22) Filed: May 29, 2009

(65) Prior Publication Data

US 2010/0202079 A1 Aug. 12, 2010

Related U.S. Application Data

(60) Provisional application No. 61/155,228, filed on Feb. 25, 2009, provisional application No. 61/151,561, filed on Feb. 11, 2009, provisional application No. 61/151,360, filed on Feb. 10, 2009.

(51) Int. Cl.
  *G11B 5/09* (2006.01)
(52) U.S. Cl. .......................................... 360/51
(58) Field of Classification Search ............... 360/51, 360/46, 31, 48, 137, 75; 369/47.28, 47.51, 369/47.41, 30.21, 13.55; 428/826
  See application file for complete search history.

(56) References Cited

U.S. PATENT DOCUMENTS

| | | | |
|---|---|---|---|
| 2,979,557 A * | 4/1961 | Schroeder | 386/275 |
| 2,979,558 A * | 4/1961 | Leyton | 386/275 |
| 5,241,429 A * | 8/1993 | Holsinger | 360/46 |
| 6,643,082 B1 | 11/2003 | Belser | |
| 6,738,207 B1 | 5/2004 | Belser | |
| 7,046,597 B2 * | 5/2006 | Usui et al. | 369/47.41 |
| 7,133,229 B2 | 11/2006 | Semba | |
| 7,224,652 B2 * | 5/2007 | Arai | 369/47.28 |
| 7,558,171 B2 * | 7/2009 | Ogura et al. | 369/47.51 |
| 2005/0157597 A1 | 7/2005 | Sendur | |
| 2006/0280975 A1 | 12/2006 | Albrecht | |
| 2007/0258161 A1 | 11/2007 | Richter | |
| 2008/0075978 A1 | 3/2008 | Weller | |
| 2008/0304173 A1 | 12/2008 | Albrecht | |
| 2009/0002865 A1 | 1/2009 | Venkataramani | |
| 2009/0002867 A1 | 1/2009 | Gage | |
| 2009/0002868 A1 | 1/2009 | Mallary | |
| 2009/0003144 A1 | 1/2009 | Mallary | |
| 2009/0009901 A1 | 1/2009 | Goldberg | |
| 2009/0046385 A1 | 2/2009 | Yamamoto | |
| 2009/0059430 A1 | 3/2009 | Dobisz | |

(Continued)

OTHER PUBLICATIONS

U.S. Appl. No. 61/155,228, filed Feb. 25, 2009, by Buch et al., entitled Vernier Method for BPM Write Synchronization Phase Calibration, 16 pages.

(Continued)

*Primary Examiner* — Fred Tzeng
(74) *Attorney, Agent, or Firm* — Christopher L. Holt; Westman, Champlin & Kelly, P.A.

(57) ABSTRACT

A technique is described for write synchronization phase calibration for storage media (e.g., bit patterned media). In one embodiment, a calibration write clock signal may be generated at a frequency offset from a nominal dot frequency of a bit patterned storage media. A periodic signal that was written to the media synchronous to the calibration write clock signal may then be read and mixed with a reference periodic signal at the nominal dot frequency to obtain a difference signal. This difference signal may be demodulated to determine a phase correction for write synchronization to the media.

50 Claims, 17 Drawing Sheets

U.S. PATENT DOCUMENTS

| | | | |
|---|---|---|---|
| 2009/0067082 | A1 | 3/2009 | Albrecht |
| 2010/0118427 | A1* | 5/2010 | Buch et al. .................. 360/51 |
| 2010/0118428 | A1* | 5/2010 | Buch et al. .................. 360/51 |
| 2010/0118429 | A1* | 5/2010 | Vikramaditya et al. ........ 360/51 |

OTHER PUBLICATIONS

U.S. Appl. No. 61/151,561, filed Feb. 25, 2009, by Buch et al., entitled Vernier Cal to Determine Clock Phase for Synchronous Writing to Bit Patterned Media (BPM), 12 pages.

U.S. Appl. No. 61/151,360, filed Feb. 25, 2009, by Buch et al., entitled Vernier Cal to Determine Clock Phase for Synchronous Writing to Bit Patterned Media (BPM), 12 pages.

U.S. Appl. No. 12/267,305, filed Nov. 7, 2008, by Buch et al., entitled Interspersed Phase-Locked Loop Fields for Data Storage Media Synchronization, 25 pages.

U.S. Appl. No. 12/267,168, filed Nov. 7, 2008, by Vikramaditya et al., entitled Write Clock Control System for Media Pattern Write Synchronization, 26 pages.

U.S. Appl. No. 12/267,215, filed Nov. 7, 2008, by Buch et al., entitled Eliminating Sector Synchronization Fields for Bit Patterned Media, 21 pages.

U.S. Appl. No. 12/267,234, filed Nov. 7, 2008, by Buch et al., entitled Measurement of Round Trip Latency in Write and Read Paths, 25 pages.

U.S. Appl. No. 12/266,677, filed Nov. 7, 2008, by Buch et al., entitled Write Precompensation System, 20 pages.

* cited by examiner

WRITE SYNCHRONIZATION PHASE CALIBRATION FOR STORAGE MEDIA

CROSS REFERENCE TO RELATED APPLICATIONS

The present application claims priority to the following U.S. Provisional Patent Applications, the content of each of which are incorporated herein by reference:

U.S. patent application Ser. No. 61/155,228, filed on Feb. 25, 2009, by Bruce Douglas Buch and Mathew P. Vea, entitled VERNIER METHOD FOR BPM WRITE SYNCHRONIZATION PHASE CALIBRATION;

U.S. patent application Ser. No. 61/151,561, filed on Feb. 11, 2009, by Bruce Douglas Buch, entitled VERNIER CAL TO DETERMINE CLOCK PHASE FOR SYNCHRONOUS WRITING TO BIT PATTERNED MEDIA (BPM); and U.S. patent application Ser. No. 61/151,360, filed on Feb. 10, 2009, by Bruce Douglas Buch, entitled VERNIER CAL TO DETERMINE CLOCK PHASE FOR SYNCHRONOUS WRITING TO BIT PATTERNED MEDIA (BPM).

BACKGROUND OF THE INVENTION

The invention relates generally to data storage and processing systems and, in particular, write clock control for such systems.

Data storage media, such as disk drives, may comprise one or more magnetic disks on which information may be stored as corresponding magnetic polarities. For example, a series of information bits, e.g., "1010" may be stored on the magnetic media as magnetic transitions corresponding to +1, −1, +1, −1. Conventionally, using what is known as "continuous magnetic media," there is no strong requirement for the accuracy of the absolute positions of the written data positions. With continuous media, preambles, or training patterns, are written as part of the write operations based on a write clock (which times the writing of information to the disk), to depict the start of a data sector and the start of the data within the sector. In addition, the training patterns provide timing information for read clock synchronization, since the training patterns are written at the same time as the data using the fixed frequency write clock, which for various reasons, may vary slightly over time. Accordingly, as sectors are re-written, the starting points may vary slightly, and thus, read operations must re-synch at the start of each sector to ensure alignment of the read operation to the start of the data as well as the timing of the data.

With continuous magnetic media, the system reads a given sector by locating the associated training pattern and synchronizing a variable frequency read clock to the frequency and phase of the pattern as read from the medium. The synchronizing of the read clock is required to overcome differences in disk speed between the read and write operations, differences in fly height, and so forth. At the start of the sector the read clock is brought into frequency and phase synchronization with the recorded training pattern by a read channel digital phase lock loop. After the read clock is synchronized to the training pattern data, the read clock is synchronous with the data, which was recorded at the same time using the same fixed-frequency write clock.

Bit patterned media ("BPM"), on the other hand, is a relatively new magnetic data storage technique that provides patterns of magnetic recording regions (e.g., "dots" or "islands") within non-magnetic material. One reason for using BPM is the magnetic separation (isolation) properties of the individual dots, which essentially allows reliable storage of signals that are recorded on the dots. The dots, and thus, the signals, can be closer together without adversely affecting signal stability and the technique is therefore beneficial to increasing information (areal) density on the media. In contrast to conventional continuous magnetic media, for efficient use of BPM capacity the write operations to BPM should be aligned such that write current transitions are synchronized with the patterns of dots. Such synchronization is also required for reading the magnetic states of the dots.

Generally, for BPM systems, a read clock is synchronized to timing signals read from the media itself. However, the reader and the writer are typically separated by small distance, as well as latencies caused by intermediate electronics. Thus, there is a phase difference between the read clock and the write clock.

SUMMARY OF THE INVENTION

The present invention is directed to a technique for write synchronization phase calibration for storage media (e.g., bit patterned media). In particular, in one embodiment, a calibration write clock signal may be generated at a frequency offset from a nominal dot frequency of a bit patterned storage media. A periodic signal that was written to the media synchronous to the calibration write clock signal may then be read and mixed with a reference periodic signal at the nominal dot frequency to obtain a difference signal. This difference signal may be demodulated to determine a phase correction for write synchronization to the media.

According to one or more embodiments described herein, the techniques may be performed using a single write operation and a single read operation. Also, one or more embodiments include provisions for write clock phase calibration based on sub-track skew, self heating/cooling effects, and circumferential variation of the media.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
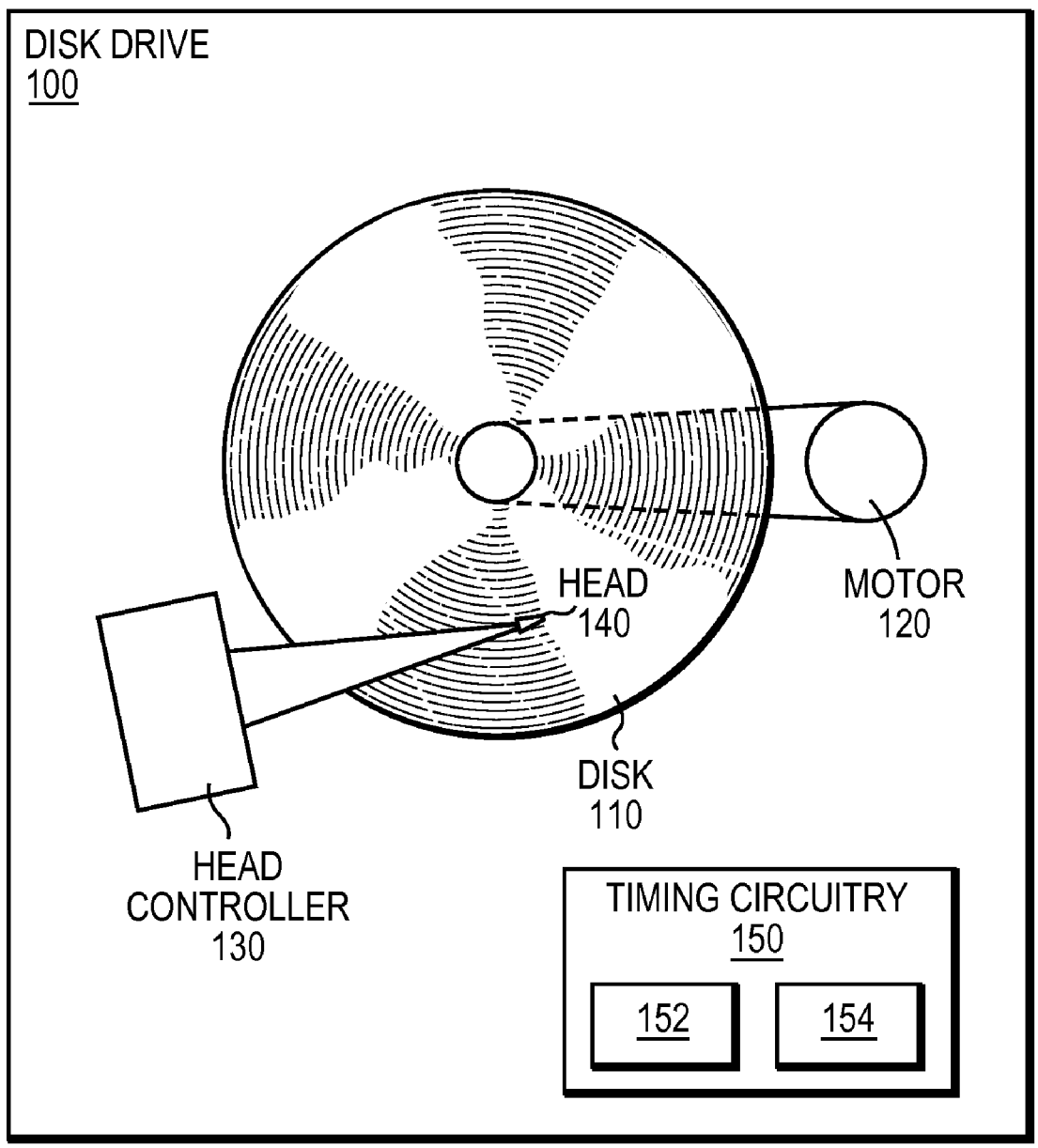
FIG. 1A illustrates an example disk drive.

Briefly, FIG. 1A illustrates an exemplary disk drive 100 (e.g., a hardware view) that comprises a magnetic recording medium, such as a magnetic disk 110, that advantageously may be used in accordance with the illustrative embodiments. The disk 110 may comprise, for example, a magnetic recording layer deposited on a substrate, as will be understood by those skilled in the art. The disk also may contain other magnetic or non-magnetic layers, such as a soft magnetic underlayer, exchange-coupled layer, lubrication layer, carbon overcoat, etc., which are not explicitly shown. The recording layer may be fabricated using various ferromagnetic materials and alloys, e.g., embodied as thin-film or particulate media, and may be deposited on the substrate using a variety of deposition techniques known in the art, and in particular, in accordance with bit patterned media (BPM) as described herein. The substrate also may be constructed from various materials, such as glass or conventional aluminum-magnesium substrates used for magnetic disks. The disk drive 100 may also comprise a motor 120 used to spin the disk 110, as well as a head controller 130 to control a read-write head 140, as will be understood by those skilled in the art. In addition, or as a part of head controller 130, timing circuitry 150 (such as a write clock generator 152 and a write clock phase correction module 154, as described herein) may be used to control the timing of signals to the read-write head and to control clock synchronization. In particular, a write transducer may apply magnetic signals to the hard disk media at a desired location on the media to write a serialized bit stream onto the media. The present invention relates to precisely identifying the desired location for a write operation by the write head/transducer (e.g., by correcting the phase shift that occurs between the reader and the writer as described in detail below).

Figure 1B:
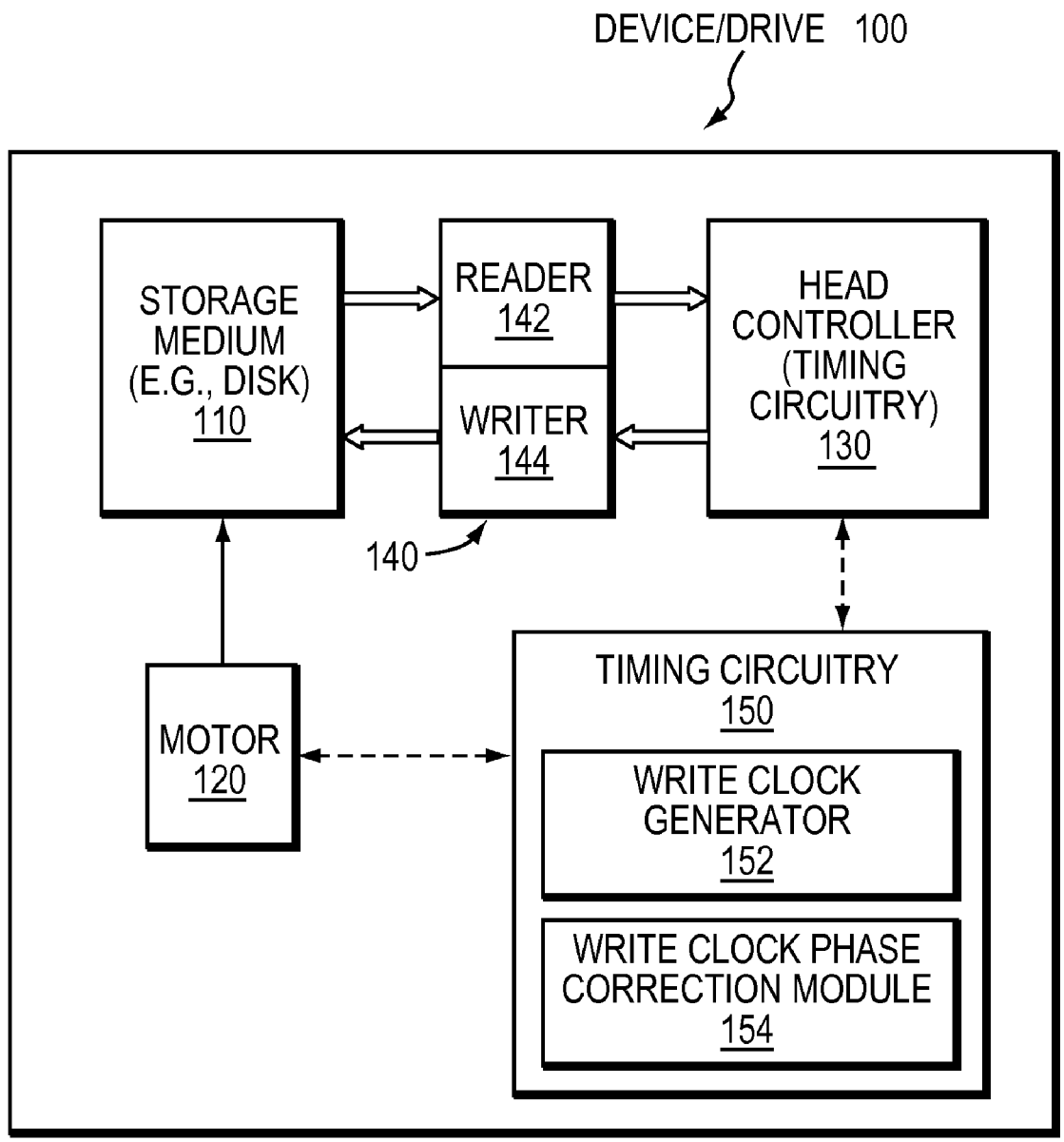
FIG. 1B illustrates an example block diagram of the disk drive of FIG. 1A.

Referring now to FIG. 1B, which has elements in common with FIG. 1A, a read-write head 140 has a reader 142 to read information from the disk 110, and a writer 144 to write information to the disk, as the disk is spun by the motor 120. The head controller 130 (e.g., circuitry used to control the track, position, etc. of the reading and writing operations and circuitry) receives information (e.g., data or timing information) from the read-write head 140, and provides information to the read-write head, as described herein. Illustratively interconnected with both the head controller 130 and the motor 120 is timing circuitry 150 (though as noted the timing circuitry may be a part of head controller 130), which may synchronize the frequency of a clock (e.g., a "data-rate clock") to the rotational speed of the spinning disk 110 using known Disk Locked Clock (DLC) techniques.

Note that according to the techniques described herein, the write clock phase correction module 154 (of timing circuitry 150) may illustratively comprise sub-modules (not shown) specific to each appropriate task. For instance, "Vernier demodulation circuitry" and a separate "phase estimator" may be distinct sub-modules of module 154 to perform their respective functions as described below. The view shown and described herein is merely an example, and other arrangements of circuitry may be designed and implemented to achieve similar functionality, as may be appreciated by those skilled in the art.

Figure 2:
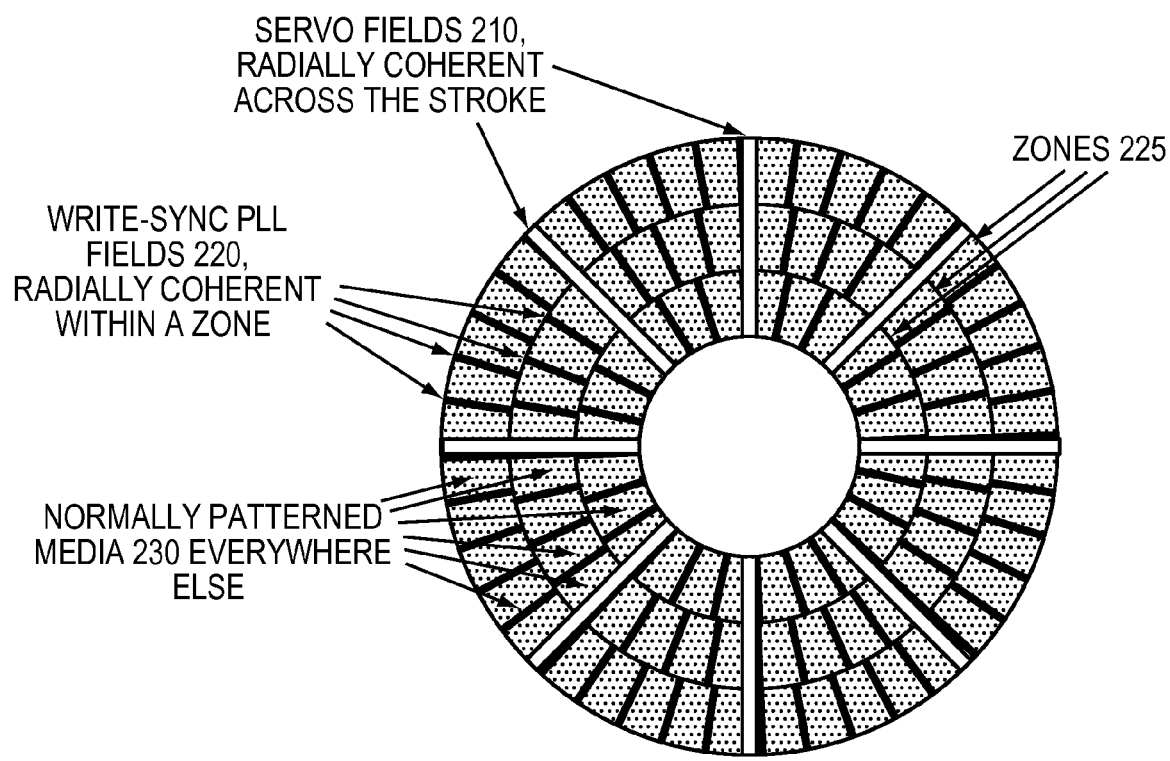
FIG. 2 illustrates an example view of information stored on a media having interspersed PLL fields.

Illustratively, the media (e.g., disk 110) is arranged as Bit Patterned Media (BPM), which provides patterns of magnetic regions (e.g., "dots" or "islands") within non-magnetic material (e.g., "troughs"). Referring to FIG. 2, a BPM disk 200 may include pre-recorded or specially patterned servo synch fields 210 that are radially coherent as a read head moves across the media and, illustratively, may further include timing synchronization fields 220 that are interspersed in the writable portions 230 of disk. The timing synchronization fields may be referred to hereinafter also as "PLL fields" (phase-lock loop fields). (Notably, servo field position relative to the PLL fields is merely illustrative, such as showing that the PLL fields 220 occur more frequently than the servo fields.) The servo fields 210 may be radially coherent across the disk surface, while in the example, the PLL fields 220 are radially coherent within a "zone" 225.

For efficient use of the BPM storage capacity, write operations to BPM should be aligned such that write current transitions are synchronized with the patterns of dots, i.e., efficient use of BPM capacity requires tight synchronization of the write clock to the phase and frequency of the media itself (i.e., to the dots). The write operations, if not synchronized to the dots, may be attempting to write between the dots on the non-magnetic areas of the media or dots may be skipped, thereby reducing the effective storage capacity of the media.

Figure 3:
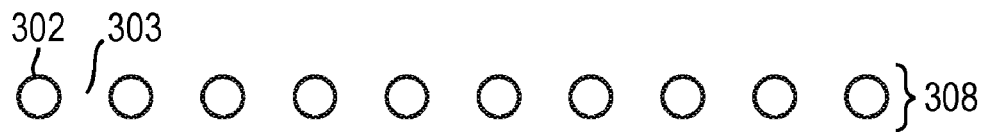
FIG. 3 illustrates an example view of bit patterned media (BPM) having magnetizable islands/dots.

Specifically, with reference to FIG. 3, bit patterned media (BPM) consists of magnetic material, or dots, 302 arranged in patterns in non-magnetic material 303, such as along "tracks" 308. In a recording device that uses BPM, a bit is recorded as a single domain provided in a predefined magnetic island, instead of as the conventional multiple grains of magnetic material per bit found in continuous recording. The single domain feature of BPM allows the potential for higher areal density by obviating some of the constraints of continuous recording.

Figure 4A:
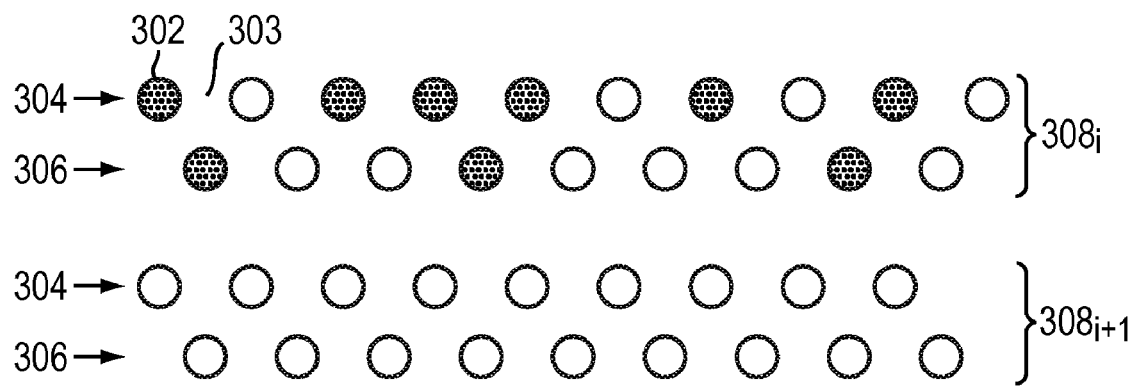
FIGS. 4A-B illustrate BPM dots that are positioned in even and odd sub-tracks.
Figure 4B:
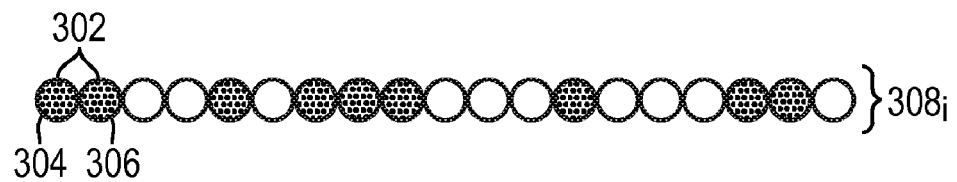

Illustratively, referring now to FIGS. 4A-B, BPM dots 302 may be arranged as offset sub-tracks to achieve even greater data density on the medium (e.g., due to physical and magnetic properties). For example, the dots may be staggered as illustratively described in commonly-owned, copending U.S. patent application Ser. No. 11/430,809 (published as Publication No. 2007/0258161 on Nov. 8, 2007), filed on May 8, 2006 by Richter et al., for a DATA STORAGE DEVICE WITH BIT PATTERNED MEDIA WITH STAGGERED ISLANDS. In particular, as shown in FIG. 4A, BPM dots 302 are positioned in even and odd sub-tracks 304, 306 that together are a track $308_i$, $308_{i+1}$, and so forth. A reader (not shown) reads dots from the two sub-tracks as one logical track, with transitions in the read signal corresponding to an even dot, an odd dot, an even dot, an odd dot, and so forth. FIG. 4B illustrates the read signal that corresponds to reading the darkened and light dots in the logical track $308_i$.

The respective dots in a track 308 are in close proximity to one another, and write transitions at a write head, or writer 144, must be precisely aligned with the dots, such that the data are recorded therein. Otherwise, a single dot may experience conflicting magnetization forces from the writer, resulting in a bit of indeterminate state being written. Efficient utilization of BPM capacity requires synchronous writing, such that the respective transitions coincide at the write head with the respective dots 302 under the write head and dots are not generally missed. Thus, the timing of the write clock must be controlled, which requires calculations that include the phase difference between the reader and the writer based upon a known read location. This phase difference consists of several components, such as physical separation of the reader and writer, round trip latency in the write and read paths, and others.

Illustrative techniques that may be used to maintain timing synchronization are described in more detail in commonly-owned, copending U.S. patent application Ser. No. 12/267,305, which was filed on Nov. 7, 2008, by Bruce Douglas Buch et al. for INTERSPERSED PHASE-LOCKED LOOP FIELDS FOR DATA STORAGE MEDIA SYNCHRONIZATION, which describes how phase and frequency errors may be determined from reading signals from interspersed PLL fields. The phase and frequency errors may be used to drive the write clock frequency to the precise phase and frequency of the media dots, as described in more detail in commonly-owned, copending U.S. patent application Ser. No. 12/267,168, which was filed on Nov. 7, 2008, by Barmeshwar Vikramaditya et al., entitled WRITE CLOCK CONTROL SYSTEM FOR MEDIA PATTERN WRITE SYNCHRONIZATION. The write clock update resulting from the reading of an interspersed PLL fields persists until the reading of a next PLL field, where another phase and also frequency update occurs. During the PLL-to-PLL interval, phase error accumulates, due to, for example, mechanical disturbances. However, as noted, the interval between PLL fields is chosen to ensure that, under worst case expected conditions, the accumulated phase error stays within an acceptable range. In addition, as described therein, this accuracy may be maintained through various techniques designed for BPM devices. For instance, a phase error may be determined from a single PLL field and a frequency error may be determined from the phase errors associated with successive PLL fields. Further, the ability to reach single-dot precision without having any initial locational or timing reference is described in commonly-owned, copending U.S. patent application Ser. No. 12/267,215, which was filed on Nov. 7, 2008, by Bruce Douglas Buch et al. for ELIMINATING SECTOR SYNCHRONIZATION FIELDS FOR BIT PATTERNED MEDIA. The contents of each of the above-referenced commonly-owned, copending U.S. Patent Applications are hereby incorporated by reference herein in their entirety.

The systems described above determine the correct write location based on positions determined with reference to the read location. In other words, since the underlying media has discreet islands or dots of magnetization on which to write, the techniques above read the dots in order to determine their locations and establish timing synchronization. However, the reader and writer are separated by a non-zero phase difference due to the small distance between the read head 142 and the write head 144, and also due to any latency caused by intermediate electronics (e.g., round-trip communication delays, pre-amps, etc.). As such there is an offset between the actual read timing reference and the timing that should be used for corresponding write operations.

The latency caused by intermediate electronics, may be accounted for by first determining the systematic delay of the read and write signal paths, and applying an appropriate offset to the write signal path for write operations. One example of a technique for determining this systematic latency offset is described in commonly-owned, copending U.S. patent application Ser. No. 12/267,234, which was filed on Nov. 7, 2008, by Bruce Douglas Buch et al. for a MEASUREMENT OF ROUND TRIP LATENCY IN WRITE AND READ PATHS. The technique described therein particularly concerns measurement of the electrical round-trip latency between the reader and the writer, which may be performed without writing to the underlying media. However, this technique does not measure the full round-trip latency, which consists of the sum of the electrical latency and the latency due to the physical separation of the reader and writer.

According to the present invention, a technique is described for measuring the reader-to-writer phase offset (thus measuring the phase offset of the full round-trip latency, or said differently, the phase offset relative to the dot locations due to the full round-trip latency), such as for use in a BPM drive. In particular, a reference signal may be written to the array of media dots 302 at a nominal dot frequency (of the BPM) with incrementally increasing or decreasing phase offsets. In this manner, a "frame" of a repeated reference signal may be written, each repeat having a phase offset linearly slewing between 0 and 360 degrees. By reading back the written frame, circuitry may determine various 'regions' of phase alignment, namely, where the phase offset timed the write operations to the dots as required for the intended operation, and where the phase offset resulted in writing patterns indicative of other alignments. A proper reader-to-writer phase may thus be determined that is the phase offset to be applied to the read timing reference to generate a write clock that results in magnetic write transitions in phase with the dots 302 (e.g., after undergoing the systematic offsets in the write signal path, as mentioned above).

For example, assume that the correct read back signal appears where the reference signal was written with approximately 75 degrees of phase offset (based on a known start of the reference signal). The proper reader-to-writer phase offset, then, is approximately 75 degrees from read timing signals in order to correctly time write transitions to the dots. Note that due to the slight changes in phase, and the physical width of the dots, a range of phase offsets may work to properly write the reference signal to the dots. That is, starting with one phase (e.g., 50 degrees), the dots may just barely be written properly consistently, while at another phase (e.g., 100 degrees) begins to no longer be consistent. The "optimal" location of the dots for which the write operations should be performed may thus illustratively be the center of this consistently written region (e.g., the 75 degrees). Due to the alignment of the transitions in write patterns written at slightly different offset frequencies, this technique may allude to a Vernier-like alignment, and thus may be referred to as a "Vernier calibration" technique, as described in more detail below.

Figure 5:
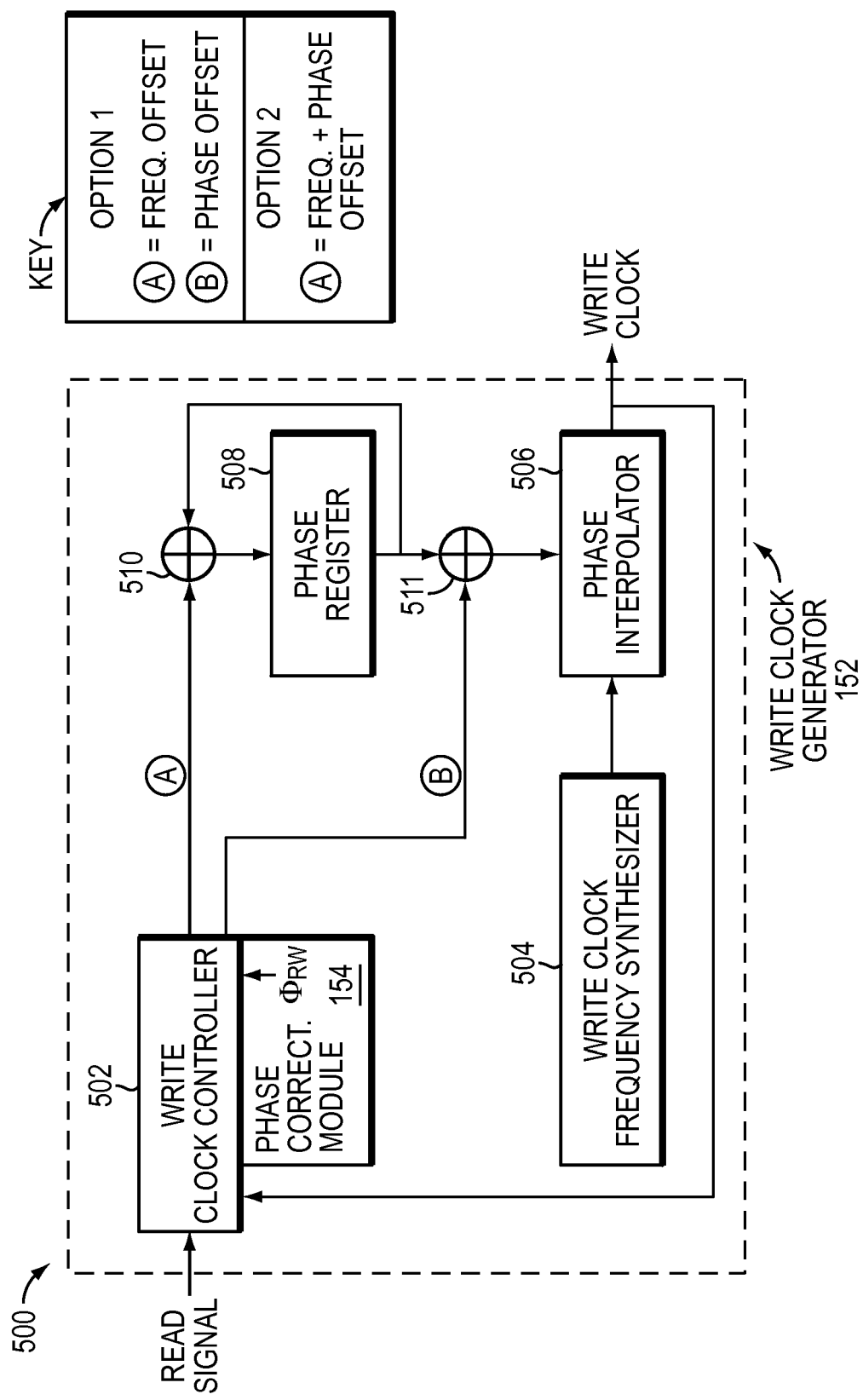
FIG. 5 illustrates an example write clock control system.

Note that this description is targeted for, but not limited to, a system using a phase interpolator to generate a write clock, such as that described in above-referenced U.S. patent application Ser. No. 12/267,168. For instance, referring briefly to FIG. 5, an example write clock control system 500 for use with BPM is shown depicting one illustrative representation of write clock generator 152. Timing signals read from the media are provided to write clock controller 502, which, in conjunction with write clock phase correction module 154 as described herein, determines a phase offset of the write clock relative to the media, that is, relative to the pattern of dots 302, and provides corresponding offset information in the form of a phase offset and/or frequency offset through an adder 510 to a phase register 508. In particular, the write clock phase correction module 154 determines (as described below) the reader-to-writer phase offset ("$\Phi_{RW}$") and provides the offset to the write clock controller 502. The write clock controller 502 then provides appropriate frequency offset information to the frequency integrator, that is, the adder 510 and the phase register 508, and provides phase offset to adder 511, the combination of which controls the phase interpolator 506 that determines write clock phase. (Alternatively, instead of using a separate phase offset adder 511, the clock controller 502 may supply phase offset in the form of an impulse added to the frequency offset information which is supplied to the frequency integrator). As noted, other techniques that may be understood by those skilled in the art to generate a write clock in a manner as described herein may also be used, and the use of a phase interpolator is merely one representative example.

Figure 6:
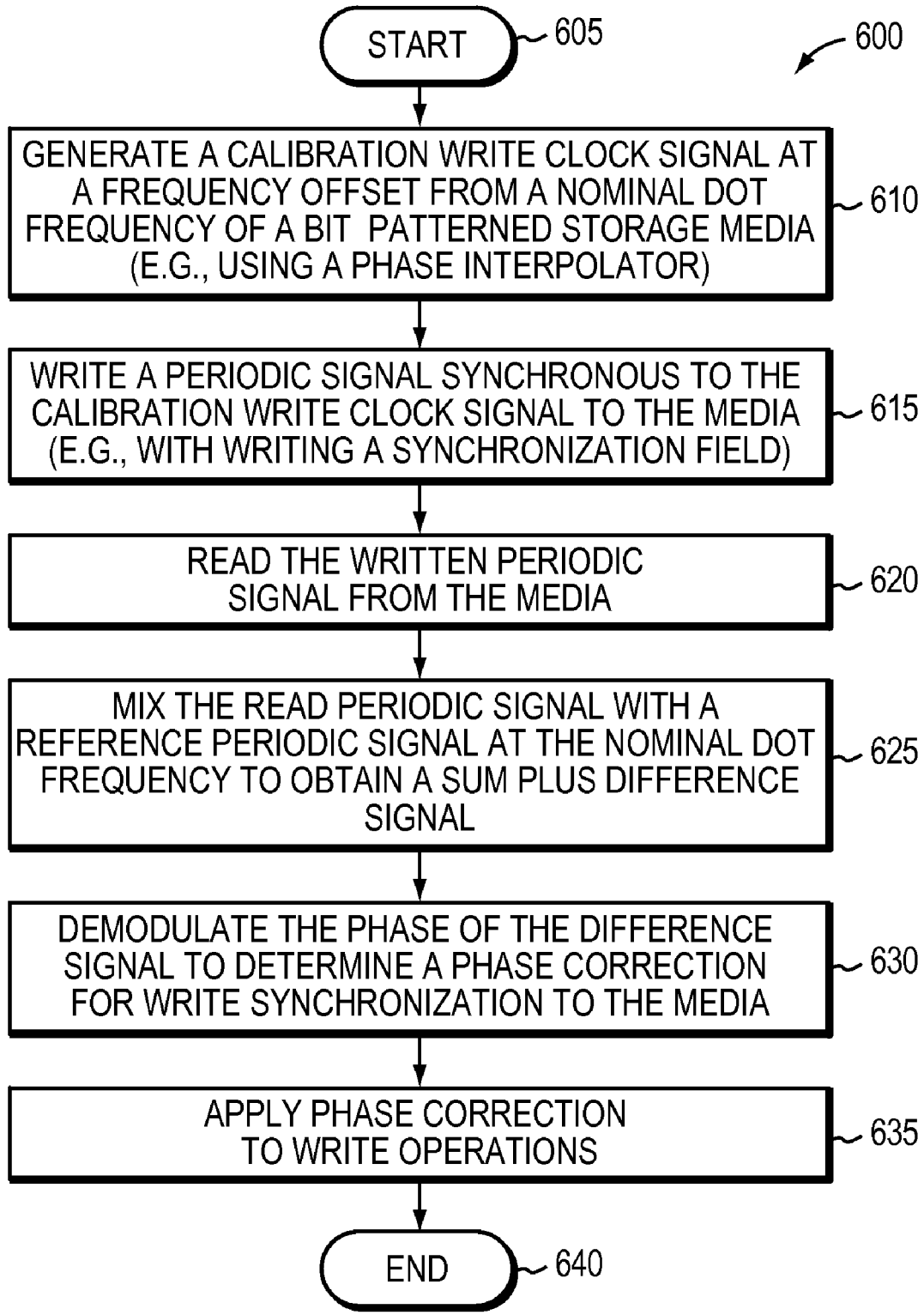
FIG. 6 illustrates an example technique for write synchronization phase calibration for storage media.

An illustrative description of this technique is now discussed briefly with reference procedure 600 of FIG. 6 (e.g., performed in part by a write clock phase correction module 154). The procedure 600 for write synchronization phase calibration for storage media (e.g., BPM) begins in step 605, and continues to step 610 where a calibration write clock signal is generated (e.g., write clock generator 152) with a frequency slightly offset from the nominal dot frequency of the media. In step 615, a periodic signal synchronous to the calibration write clock signal is written to the media (e.g., a calibration field), and as described below, may include a synchronization field. Because of the frequency offset, the phase of this periodic signal successively advances or retards with respect to the dots as the field is traversed.

This periodic signal may be read back from the media in step 620, and then in step 625 the read signal is mixed with a reference periodic signal at the nominal dot frequency to obtain a combined "sum signal" and "difference signal." In step 630, the phase correction needed for write synchronization may be demodulated from the difference signal, which may be a relatively low-frequency signal, and the phase correction is applied for the write operation in step 635. The illustrative procedure 600 then ends in step 640.

Again, due to the alignment of the transitions in write patterns written at slightly different offset frequencies, this technique may allude to a Vernier-like alignment, and thus may be referred to as a "Vernier calibration" technique. Conventionally, factory calibrations merely attempt different phase offsets during system design until a "close enough" result is achieved. However, using the Vernier calibration technique described herein, which uses all possible phase offsets (from 0 to 360 degrees), a more accurate result may be efficiently achieved, and may be performed during use of the device, to account for post-manufacturing variation in reader-to-writer phase offset. Additionally, as further described herein, various aspects of the present invention include provisions for sampling the calculated phase correction to estimate time variance of the reader-writer phase for compensation of self heating/cooling effects. The sampling may also be used to estimate the circumferential variation of the reader-to-writer phase for compensation of downtrack repeatable runout in the patterned dots of the track, as described below.

Figure 7:
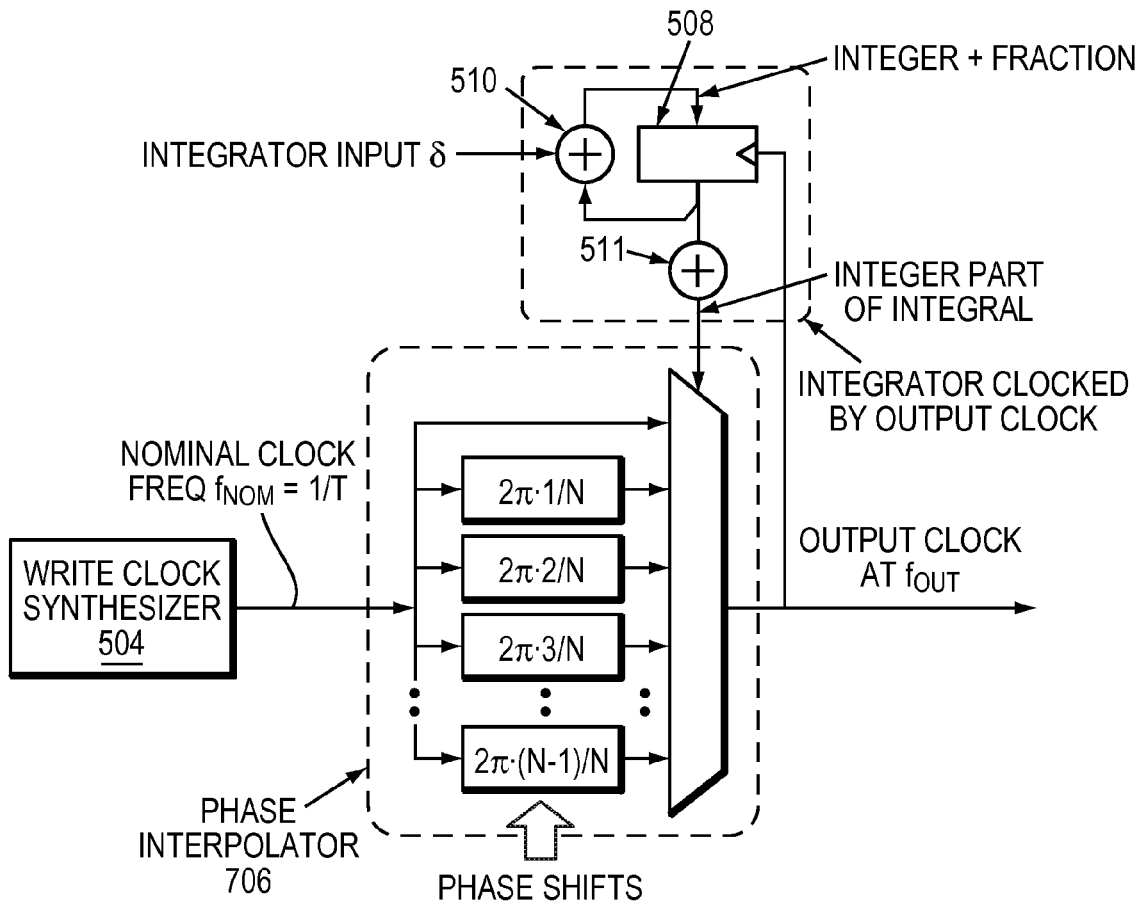
FIG. 7 illustrates an illustrative block diagram of an example interpolated clock generator.

In accordance with illustrative details of the present invention, a write clock generator may be configured to generate a calibration write clock signal at a frequency offset from a nominal dot frequency of a particular bit patterned storage media. As noted, the nominal dot frequency (or "nominal clock") is determined by a read clock that is synchronized with the underlying media. FIG. 7 shows an illustrative block diagram of an interpolated clock generator 700 (including an alternate view of portions of write clock control system 500 in FIG. 5 above) that may be used generally for write operations, and in accordance with the present invention. A clock phase interpolator 706 is conceptually a multiplexor that outputs a selected one of N equally spaced phases of its input clock. The phase selection is a phase sourced from the integration of an input frequency offset.

Accordingly, a frequency offset ("$\delta$") may be inserted at the input to the integrator (510 and 508) when writing the Vernier pattern. (Note that a "phase offset adder" 511 as described above in FIG. 5 may also be used in FIG. 7, as shown, though alternative embodiments may arrange the circuitry of interpolated clock generator 700 in a different manner to achieve functionally similar results.) When $\delta$ equals 0, the output from the phase interpolator 706 has the same period as the input clock (from write clock synthesizer 504). When $\delta$ does not equal 0, the clock timing (read/write edges) are advanced or retarded by a fraction of a cycle (a frequency offset) equal to $\delta/N$, yielding an output with a period of $(1+\delta/N)\cdot T$, where T is the period of the nominal clock, or dot frequency. For example, the phase offset per iteration may be selected from T/32, T/64, T/128, etc. (mT/n, generally), resulting in a frequency offset of 1/(31T), 1/(63T), 1/(127T), etc. Small frequency offsets typically result in high resolution at a cost of the time to traverse a full "frame" of phase offsets. On the other hand, larger frequency offsets may reduce the time to reach a full frame, but at a cost of lower resolution. Thus, the frequency offset is a design choice, although different offsets may be used at different times and/or for different reasons (e.g., depending on busy/idle state of the drive, error states, etc.).

Figure 8:
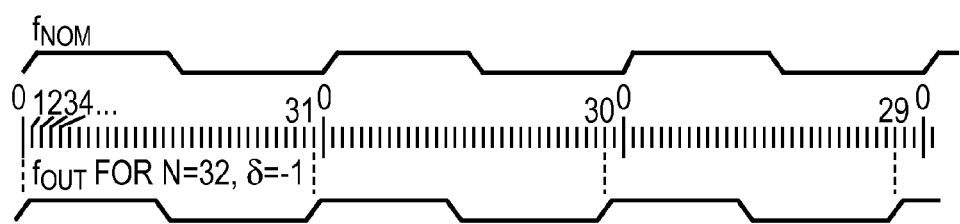
FIG. 8 illustrates an example frequency shift (phase slew) from successively advancing phase offset.

FIG. 8 illustrates an example of a frequency shift 800, or phase slew, implemented by using the integrator 706 to successively advance the interpolator "tap" selection (e.g., the frequency offset) by one tap for each output clock period. The upper trace represents an input clock running at the nominal dot frequency $f_{NOM}$, the hash marks represent the possible discrete times at which an output clock edge may be produced, e.g., 32 for a 1/32 frequency offset as shown, 64 for a 1/64 offset, etc., and the lower trace represents the frequency-shifted output clock. For this example of a 32-tap interpolator, the output clock cycles through 32 periods in 31 cycles of the input clock, that is, the clock reaches the initial phase offset after changing the phase offset 32 times.

In general, for an N-tap interpolator, and an integrator input of $\delta$, the output clock produced by the system configured in FIG. 7 will have a frequency of:

$$f_{OUT} = f_{NOM} \frac{1}{1 + \delta/N} \qquad \text{Eq. 1}$$

The sign convention used herein results in having negative $\delta$'s advance the phase, thus successively increasing the output frequency, and positive $\delta$'s retard the phase, successively lowering the frequency, with respect to the dots of the media. Note that $\delta$ need not be an integer.

Figure 9:
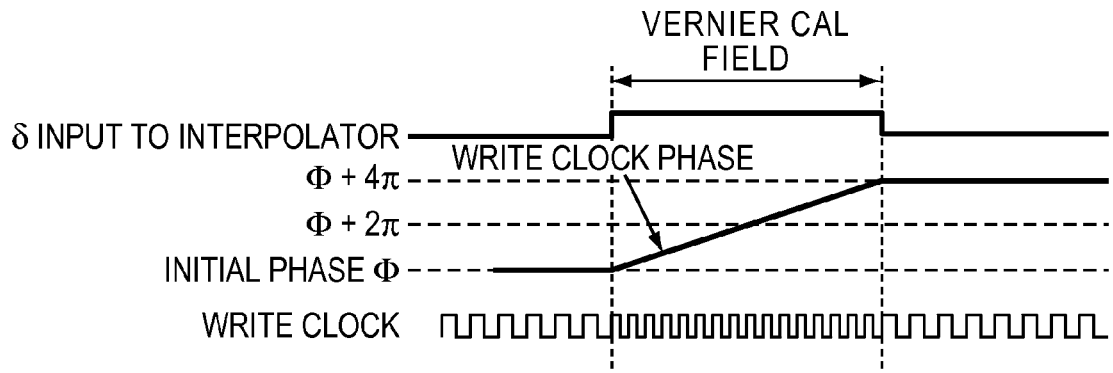
FIG. 9 illustrates how a calibration field may be written with a clock that starts with an existing write clock phase that linearly slews in phase throughout a calibration field.

Using the timing circuitry above, a periodic signal synchronous to the calibration write clock signal may be written to the media, such as to a specific calibration field or any suitable location on the media. With reference to FIG. 9, the calibration field may be written with a clock that starts with an existing write clock phase ("initial phase") that linearly slews in phase throughout the calibration field. The phase-slewed write clock can be generated by an interpolated clock generator like that of FIG. 7 by applying a step to the integrator input as illustrated in FIG. 9. Since this procedure determines the correction required to adjust an existing write clock phase so that write transitions are properly phased to the media dots, the initial write clock phase may be an estimate from previous calibrations, or of arbitrary phase before any calibrations are done.

The Vernier calibration field may be composed of a periodic pattern of "M" bits. In accordance with one illustrative embodiment, a square wave is used, e.g., having four bits (M=4). For instance, the square wave periodic signals may consist of: "++−−" or "−−++" or "+−−+" or "−++−" (or "1100," "0011," etc.). A square wave with a period of M bits clocked by the nominal clock has a frequency of $f_{NOM}/M$. When this pattern is used for a write signal clocked by a phase-slewed clock from an interpolator, the write signal frequency is:

$$f_{WR} = \frac{f_{NOM}}{M} \left( \frac{1}{1 + \delta/N} \right) \qquad \text{Eq. 2}$$

Figure 10:
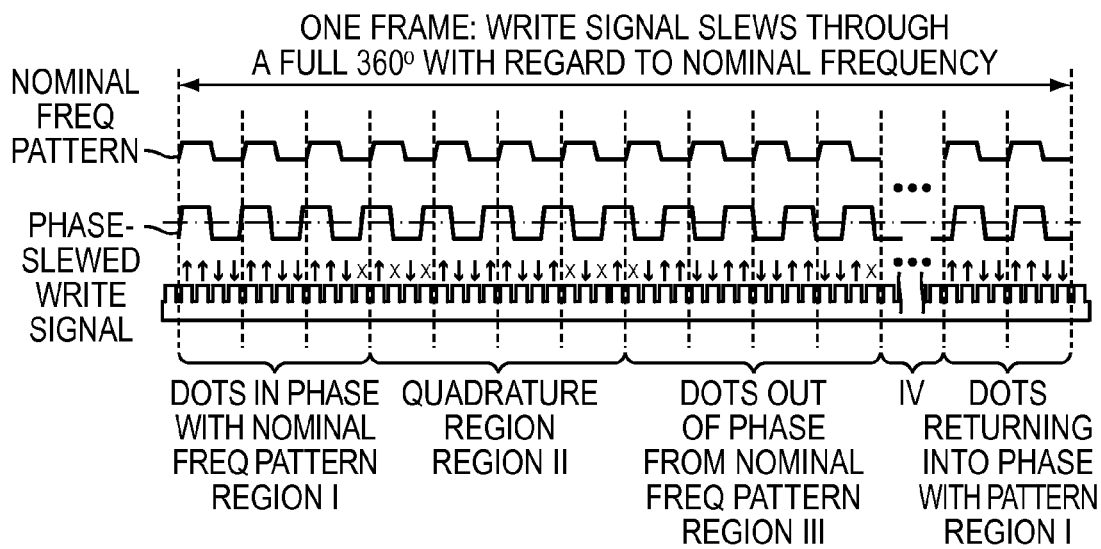
FIG. 10 illustrates four illustrative regions corresponding to four quadrants of phase that result in each frame when compared with what the written-dot states would be if the pattern had been written with optimal phase at the nominal dot frequency.

A "frame" is a field length over which the written pattern phase sweeps through (traverses) a full cycle of $2\pi$ radians relative to the media dots. When compared with what the written-dot states would be if the pattern had been written with optimal phase at the nominal dot frequency, four illustrative regions corresponding to four quadrants of phase result in each frame, as shown in FIG. 10. (Note that the transition between regions have indeterminate dot state resulting from unsynchronized writing.)

I. A region where dots are mostly written in-phase, matching the reference pattern (such that the written periodic signal when read and the reference periodic signal are the same);

II. A region where dots are mostly written in quadrature with the reference pattern;

III. A region where dots are mostly written with the reference pattern out of phase (such that the written periodic signal when read and the reference periodic signal are opposite); and IV. A second region of dots mostly written in quadrature (not explicitly shown).

Figure 11:
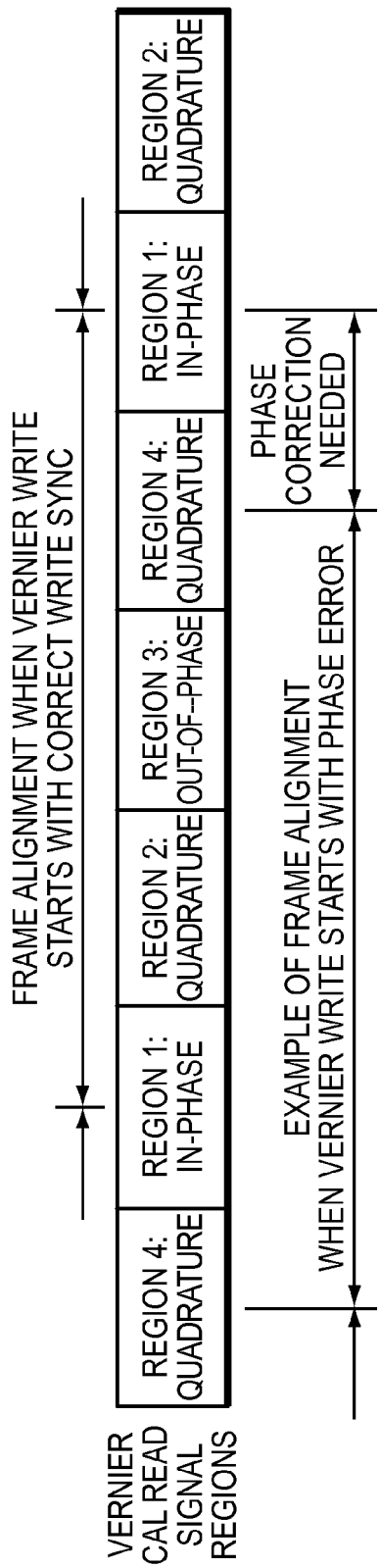
FIG. 11 illustrates a calibration frame starts with the correct write phase and with a phase error.

After the second quadrature region (region IV), the first region (region I) where the dots are in phase is again reached, having traversed a full frame of phase offsets. Note that depending on the clock phase at the start of a frame, the order of these regions may be any circular shift of the above, including orders that start and end with fragments of the same region (e.g., partial-III, IV, I, II, partial-III). As shown in FIG. 11, when a calibration frame starts with the correct write phase, a frame will start and end with an in-phase Region I (i.e., starting at the center of Region I at the optimal writing position on the dots, and ending just prior to the center of Region I). When a frame starts with a phase error, the amount of phase slew required to evoke a Region I (e.g., to reach the center) is the amount of phase correction needed.

Figure 12:
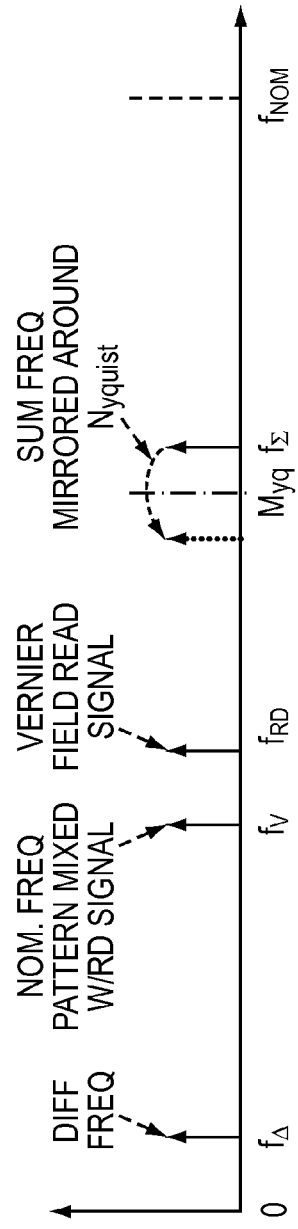
FIG. 12 illustrates a representation of sum and difference frequencies as a result of mixing the read-back calibration field with the expected timing signal.

According to the present invention, the next step for phase calibration is to read the written Vernier calibration field (the written periodic signal) from the media, to illustratively determine where the center of Region I is within the frame. In particular, the signal read from the calibration field (the read periodic signal) may be mixed with a reference signal at the nominal dot frequency (e.g., a nominal-frequency Vernier pattern) to yield the sum and difference frequencies. These frequencies are illustratively listed and shown in the spectral plot of FIG. 12. (Note that the spectral plot shown is representative for the case M=4. For higher values of M, there may be no reflection about the Nyquist frequency, as may be appreciated by those skilled in the art.)

The difference signal has a frequency corresponding to the periodicity of the four regions in a frame described above. Illustratively, the "mixing" process logically XNOR's the hard decisions of the read signal with the nominal frequency pattern (e.g., binary mixing). Alternatively, a digital multiplication may be used where the read signal (waveform samples) is multiplied by the nominal frequency pattern (e.g., 1, 1, −1, −1, as described above). Specifically, after mixing, a "sum plus difference signal" may be obtained, where Region I (in phase) manifests itself as a run of bits that are predominantly 1's, Region III (out of phase) manifests itself as a run of bits that are predominantly 0's, and Regions II and IV (quadrature) manifest themselves as alternating 0's and 1's. (Note again that the transition between regions have indeterminate dot state resulting from unsynchronized writing, and thus an unpredictable pattern after mixing which is most likely a roughly equal mix of 0's and 1's.) An example of the mixed signal and its corresponding difference frequency component is illustrated in FIG. 13.

Figure 13:
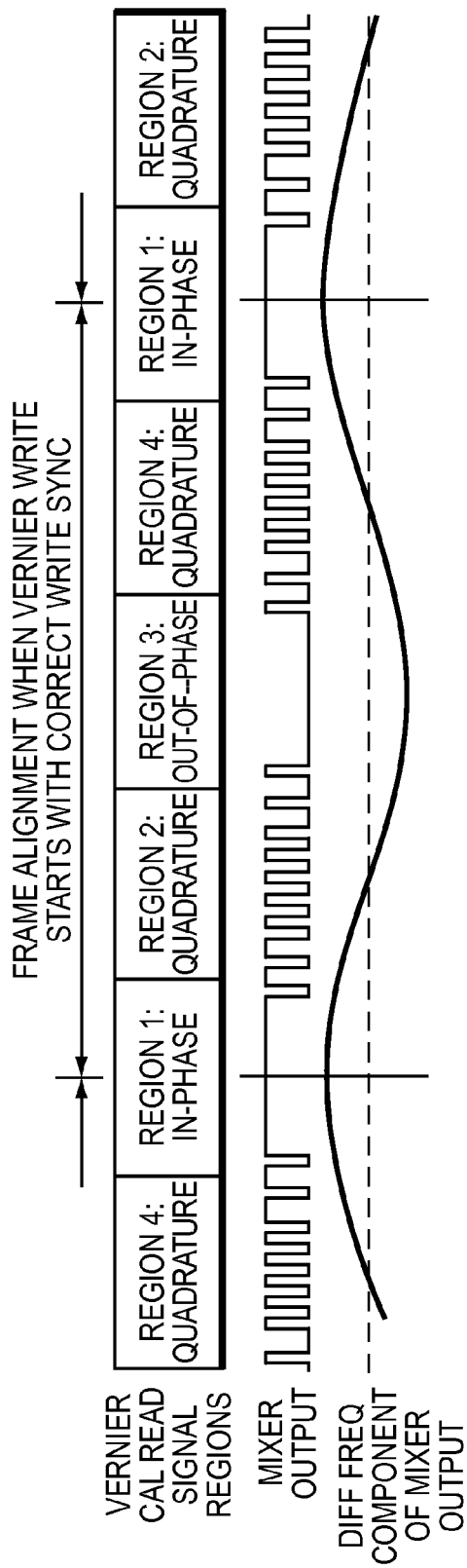
FIG. 13 illustrates an example of the mixed signal and its corresponding difference frequency component.

Demodulating the phase of the difference signal shown in FIG. 13 yields the location of the centroid of Region I within a frame, which is the phase correction to be added to the write phase at the start of a frame to get the write phase needed for write synchronization. In other words, by demodulating the difference signal, a phase correction for write synchronization to the media may be determined, which may be a difference between the start of the written periodic signal and the first region, or more accurately stated, to the center of the first region. Two illustrative techniques may be used to demodulate this phase correction. First, the bits of the mixed signal in a sliding window the length of approximately ¼ of a frame can be counted to find the centroid of the quadrant with the highest density of 1's. A more precise phase correction may be extracted by utilizing a discrete Fourier transform (DFT) phase demodulation of the difference signal (frequency component) of a frame. Further, the precision and accuracy of the phase correction may be additionally enhanced through demodulating the phase over a plurality of frames, e.g., written consecutively or at different times. For instance, multiple frames may be written for a single phase correction operation, or each operation may write a new frame, and additionally use information from previous frames to refine the phase correction over time.

Notably, since the demodulated phase is referenced to the start of a frame, it is critical to know what point in the Vernier calibration field read signal corresponds to the start of a frame. That is, the phase correction is based on the start of the written periodic signal, so determining the starting point at which the calibration field was written is crucial. This is complicated by the fact that when writing, any timing information coming from the media is relative to the read element (read head 142), and, unless previously calibrated, the spatial offset to the writer 144 is uncertain.

Figure 14:
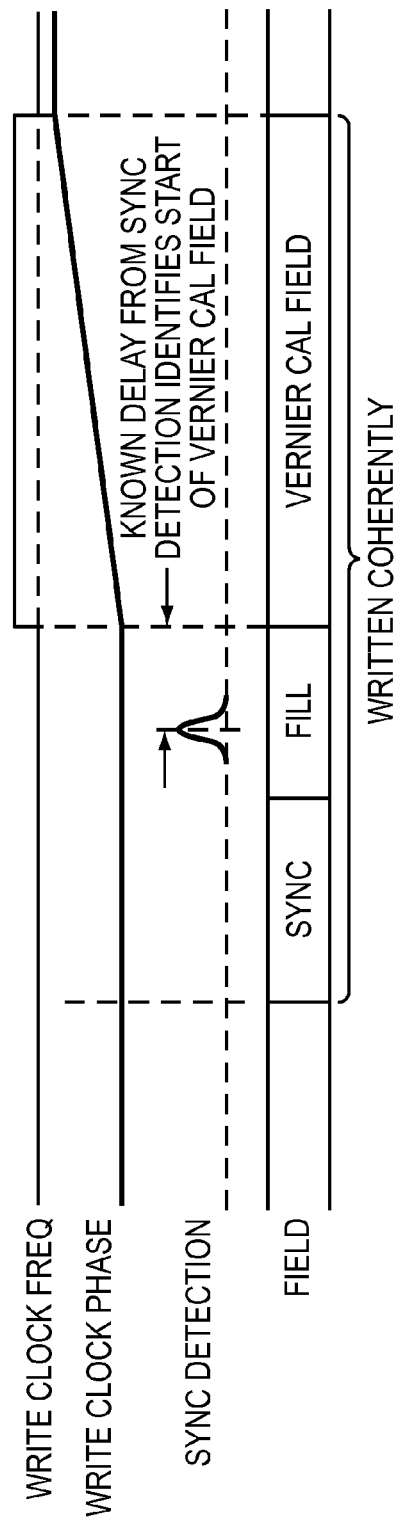
FIG. 14 illustrates an example use of a synchronization field.

One manner in which frame alignment may be identified is to precede the Vernier calibration field when writing it with a synchronization field or "sync pattern" (e.g., writing the sync pattern prior to the written periodic signal, for example, as a preamble to the frame). This makes the corresponding read signal self-referencing, in that when the sync+Vernier calibration field is read, the point at which the sync pattern is detected identifies where the Vernier calibration field begins (thus determining a start of the written periodic signal based on the written synchronization field). This concept is illustrated in FIG. 14.

Figure 15A:
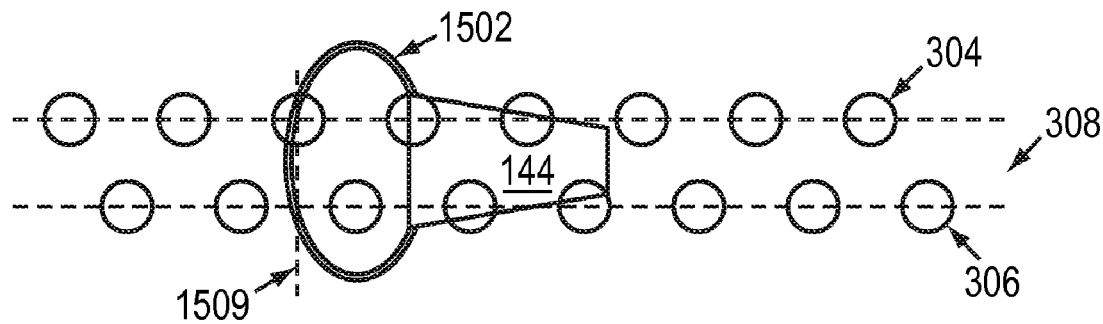
FIGS. 15A-C illustrate the effects of the write field curvature in two sub-tracks due to deviations in the cross track position of a writer.
Figure 15B:
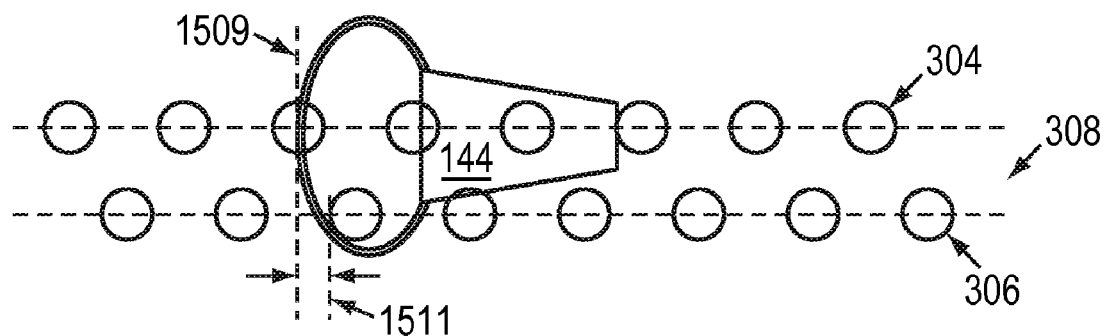
Figure 15C:
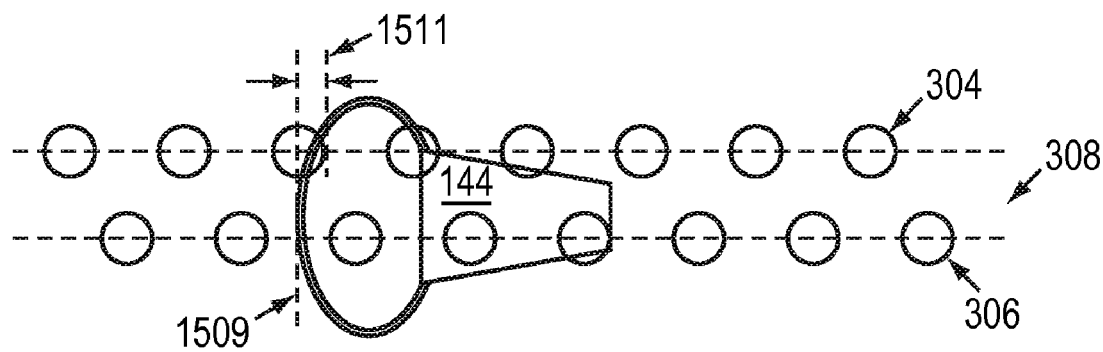
Figure 16:
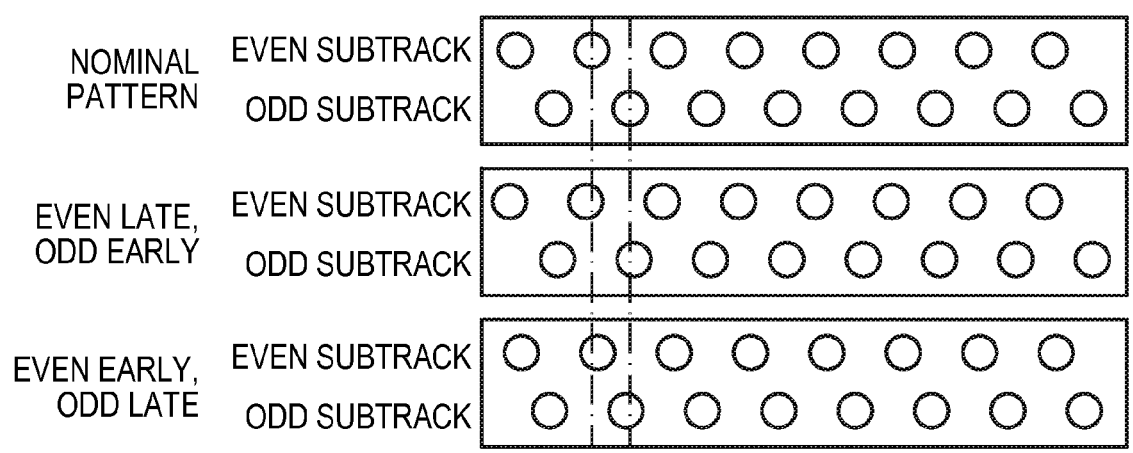
FIG. 16 illustrates an alternative view of the nominal sub-track pattern and exaggerated cases of differential even-odd skew in both directions.

The staggered dot pattern that is used for BPM can cause the optimal write phases to differ for the two sub-tracks. That is, since in one or more embodiments of BPM as described above the media may comprise staggered even and odd sub-tracks, it may be beneficial to determine a sub-track skew based on the difference signal that results from the Vernier calibration technique described herein. For instance, one reason for sub-track skew is the result of a curved write field from a writer 144. For example, referring now to FIGS. 15A-C, a write head 144 (e.g., the writer portion of a read/write head 140) has a curved write field 1502 relative to a perpendicular plane (indicated by dotted line 1509) across the track 308. FIG. 15A illustrates the writer centered over the sub-tracks, that is, centered with respect to the even and the odd sub-tracks. The effects of the curved write field in the two sub-tracks is the same, and the even and odd dots are written with the same intervals from an even dot to the next odd dot as from an odd dot to the next even dot. Deviations in the cross track position of the writer from the center of a track advances the position of the curved write field with respect to one sub-track and retards the position with respect to the other sub-track, as illustrated in FIGS. 15B and 15C. Accordingly, write transitions may be in advance of the dots in one sub-track and delayed from the dots in the other sub-track, as the interval as seen by the writer 144 from a first dot of a first sub-track (e.g., even) and the next dot (e.g., odd) differs from the interval from that next (e.g., odd) dot to the following dot (e.g., even), as indicated by the dotted lines 1511 in the drawings. The illustration in FIG. 16 shows an alternative view of the nominal sub-track pattern and exaggerated cases of differential even-odd skew in both directions.

Figure 17:
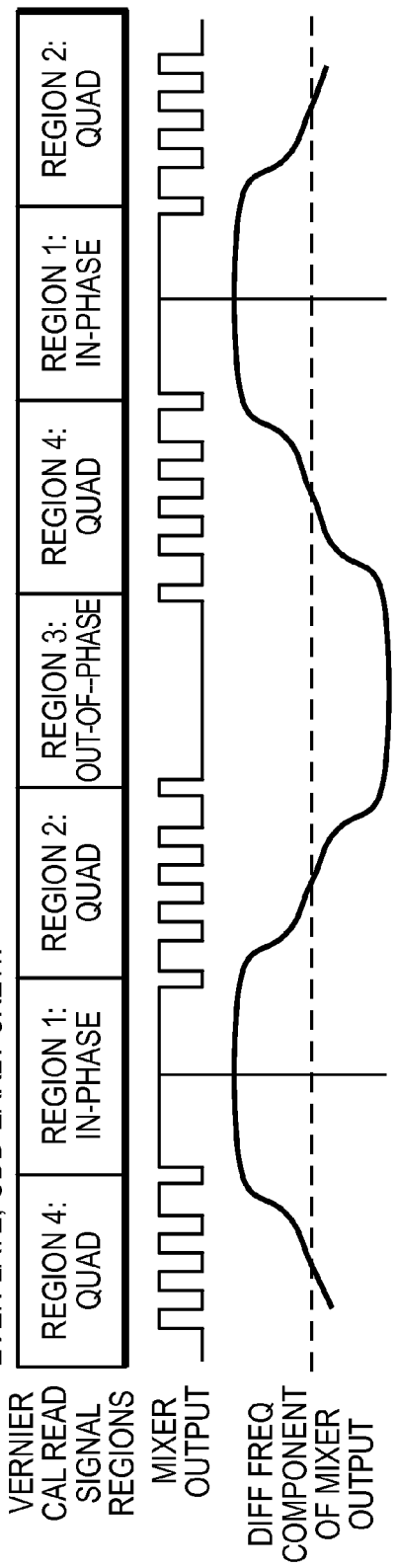
FIG. 17 illustrates sub-track skew in the even-late, odd-early direction.
Figure 18:
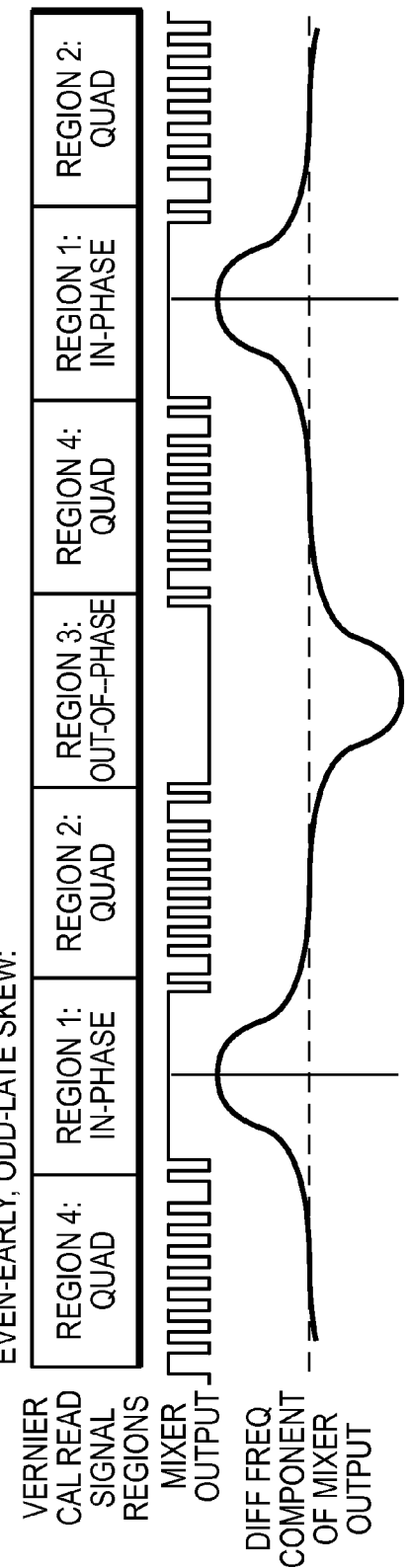
FIG. 18 illustrates sub-track skew in the odd-late, even-early direction.

Introducing sub-track skew in the even-late, odd-early direction increases the width of Regions I and III, and decreases the width of Regions II and IV. Also, increasing skew in the opposite direction widens Regions II and IV and narrows Regions I and III. These patterns and the waveshape trend of their corresponding difference frequency signals are illustrated in FIGS. 17 and 18, respectively. In the limit, the mixer output for the even-late, odd-early case (FIG. 17) becomes a square wave, and the even-early, odd-late case (FIG. 18) becomes a sequence of alternating impulses. The spectrum of the first case limit may illustratively contain a third ($3^{rd}$) harmonic with an amplitude ⅓ that of the fundamental. The spectrum of the second case may illustratively contain a $3^{rd}$ harmonic with an amplitude equal to that of the fundamental. Thus the amplitude ratio of the $1^{st}$ and $3^{rd}$ harmonics may be used as a measure of sub-track skew.

Figure 19:
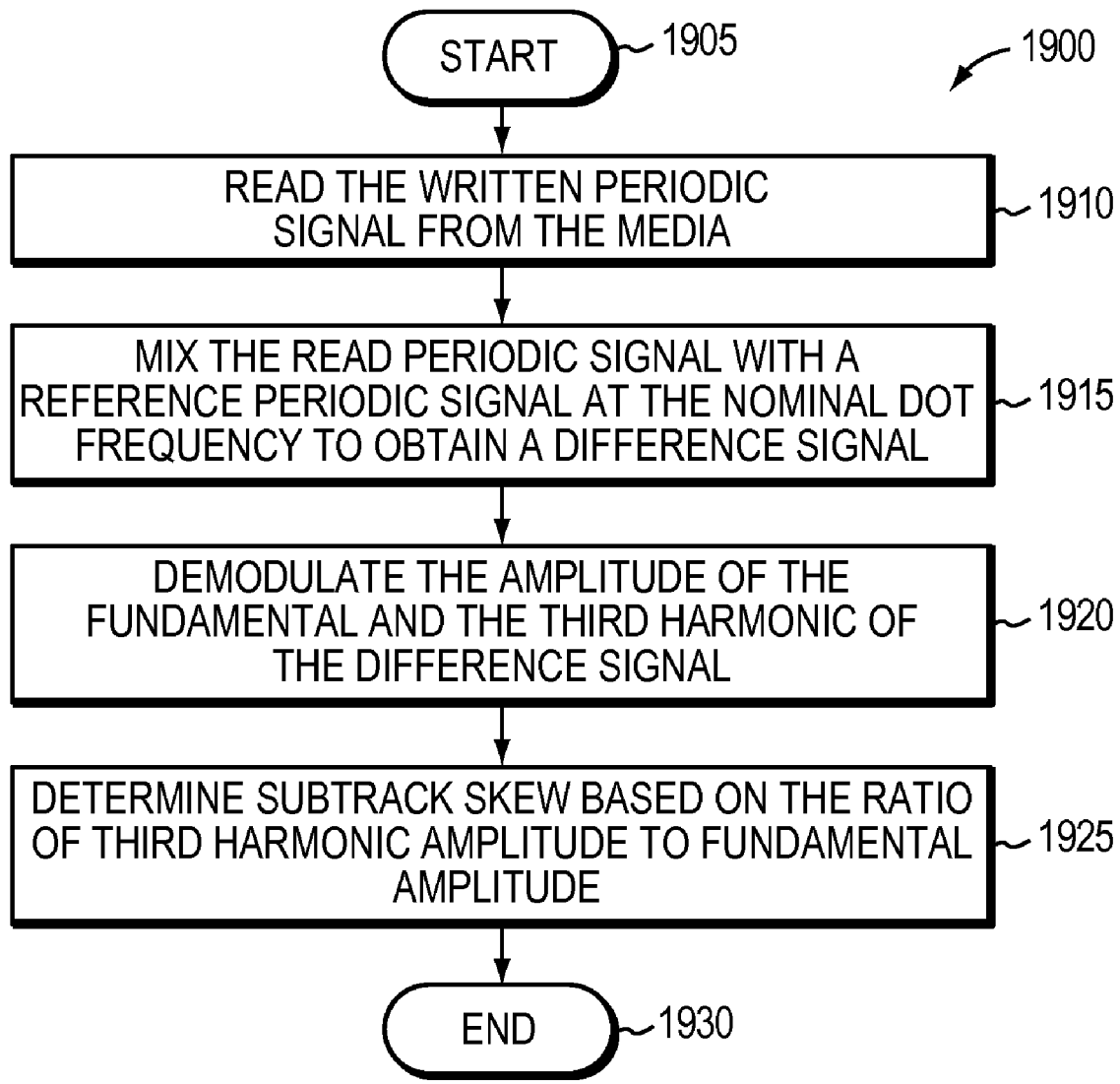
FIG. 19 illustrates a flowchart of an example procedure to compensate for regard to sub-track skew.

FIG. 19 is a brief example flowchart illustrating an example procedure 1900 with regard to sub-track skew. In particular, procedure 1900 begins in step 1905, and continues to step 1910, where the written periodic signal is read from the media, and in step 1915 is mixed with the reference periodic signal at the nominal dot frequency to obtain a sum plus difference signal. In step 1920, the difference signal may be demodulated to obtain a ratio of an amplitude of a third harmonic of the difference signal to an amplitude of a fundamental harmonic of the difference signal, indicative of the sub-track skew, which may be used in step 1925 to determine sub-track skew, and the procedure ends in step 1930.

Note that a write precompensation system (e.g., as described in commonly-owned, copending U.S. patent application Ser. No. 12/266,677, which was filed on Nov. 7, 2008, by Bruce Douglas Buch for a WRITE PRECOMPENSATION SYSTEM, the contents of which are incorporated by reference in their entirety) may be used to provide write precompensation to respective write transitions for the even and odd sub-tracks. For example, the precompensation system may determine a precompensation shift for each data bit based on known operations of the components of the channel and a short history of the data bits in the data stream, as well as based on the unequal effects of a curved write field and the known position of the write head relative to the sub-tracks (e.g., using the Vernier calibration field as described herein.) The write precompensation controller (e.g., a portion or sub-module of write clock phase correction module 154 herein) may then time shift the transitions directed to one of the sub-tracks by an appropriate amount to precompensate for the channel delays and any adverse effects of a non-centered write head (e.g., sub-track skew). In particular, the write precompensation controller may be correspondingly able to shift the transitions corresponding to the two sub-tracks by different amounts, as needed.

In accordance with one or more embodiments of the present invention, the phase corrections may be determined during factory calibration or during actual use of the device. For example, factory calibrations may be stored and used throughout the life of the device, or as a starting point for future calibrations. Alternatively or in addition, the calibration techniques may be performed during the use of the device at regular intervals, such as periodically (e.g., every 1-2 seconds), during times at which the read-write head is idle in order to avoid interrupting the normal read and write operations, or based on other factors. For example, since temperature of the device may change the reader-to-writer phase difference, it may also be advantageous to perform the recalibration measurements based on detected temperature changes to compensate for temperature fluctuations and other environmental conditions that may affect the operation of the components of the write and read paths (e.g., physical and/or electrical read-writer distance, magnetic path difference (current, distance, etc.), and other factors).

In addition, the Vernier calibration techniques herein may be used to determine the phase correction with respect to predictable self heating/cooling effects of device components. For instance, the reader-to-writer phase will vary with time in a predictable fashion due to self heating effects in the write and read channels. If the head and electronics start in a "cool" state due to the lack of activity, then the value of the reader-to-writer phase will change from the beginning of the write event to the end of the write event. The Vernier calibration can be used to characterize this time variation, e.g., as part of a set of factory calibrations. The reader-to-writer phase will also vary with time as the write channel cools down from its "warm" steady state while writing is disabled, and as such, the Vernier calibration may also be used to characterize the time constants of this cooling operation.

Figure 20:
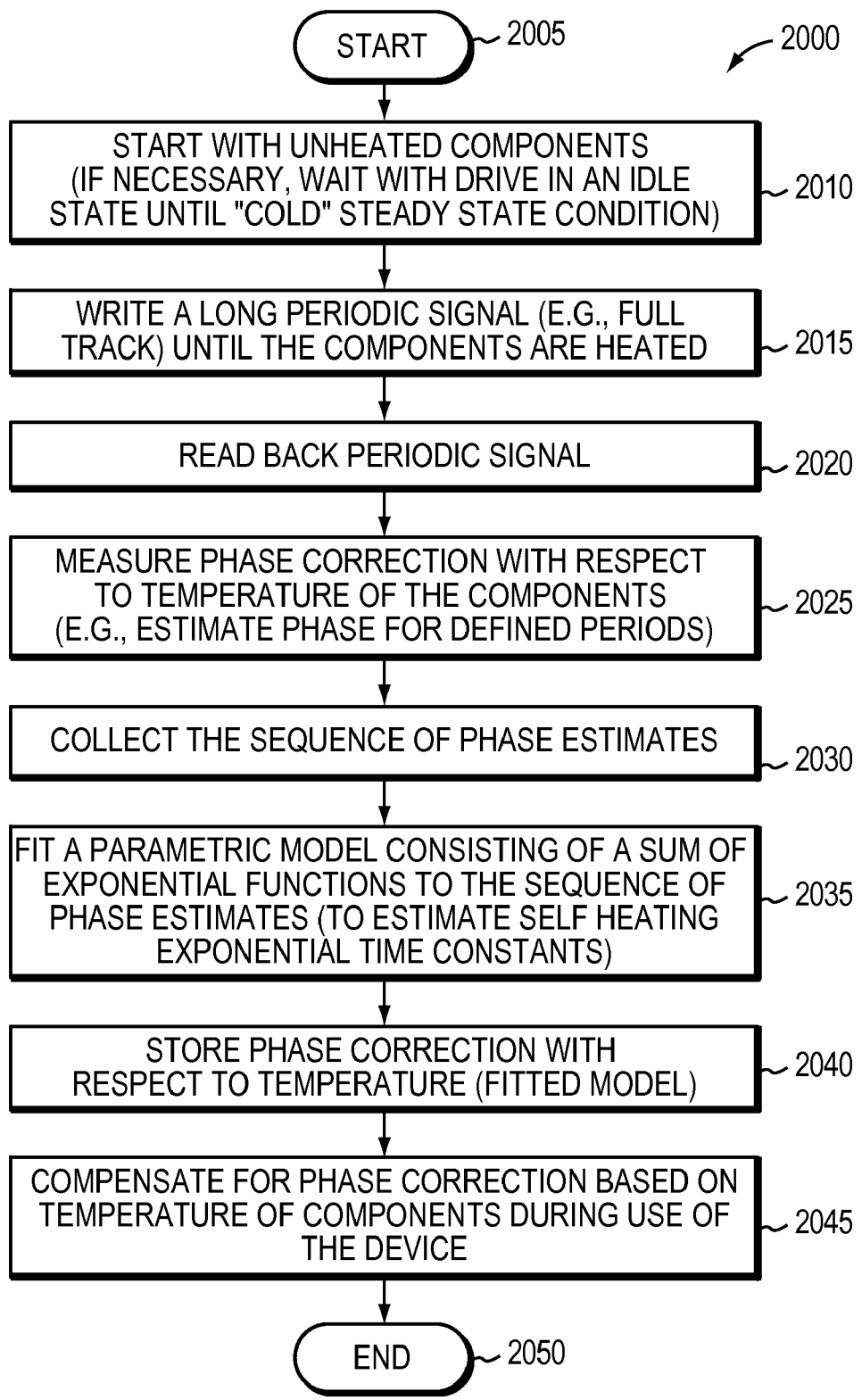
FIG. 20 illustrates a flowchart of an example procedure for determining the effect of self-heating components.

FIG. 20 is a flowchart illustrating an example procedure 2000 for determining the effect of self-heating components. In particular, procedure 2000 begins at step 2005, and continues to step 2010, where the calibration starts with unheated components. If necessary, the procedure 2000 may wait with drive in an idle state (e.g., track following but not reading or writing) until the head and electronics to reach a "cold" steady state condition. With the cool components, in step 2015 a long periodic signal (e.g., full track) may be written with the Vernier pattern at the offset frequency, thus heating the components.

In step 2020, the periodic signal (track) is read back, and in step 2025, phase correction may be measured with respect to the temperature of the components, for example, estimating reader-to-writer phase for each period of the difference frequency $f_\Delta$, or each M periods, where M is a small number. The sequence of reader-to-writer phase estimates may be collected in step 2030. In step 2035, a parametric model may be fitted with a sum of exponential functions to the sequence of reader-to-writer phase estimates, thus creating the estimate the self heating exponential time constants. The phase change may be accounted for by relating the fitted model to actual sensed temperature of the system, or to the length of time of the write. In step 2040, the phase correction with respect to temperature (fitted model) may be stored for compensation of self heating effects. The model may then be used in step 2045 to correspondingly compensate for phase correction based on temperature of components during use of the device. The procedure 2000 ends in step 2050.

Figure 21:
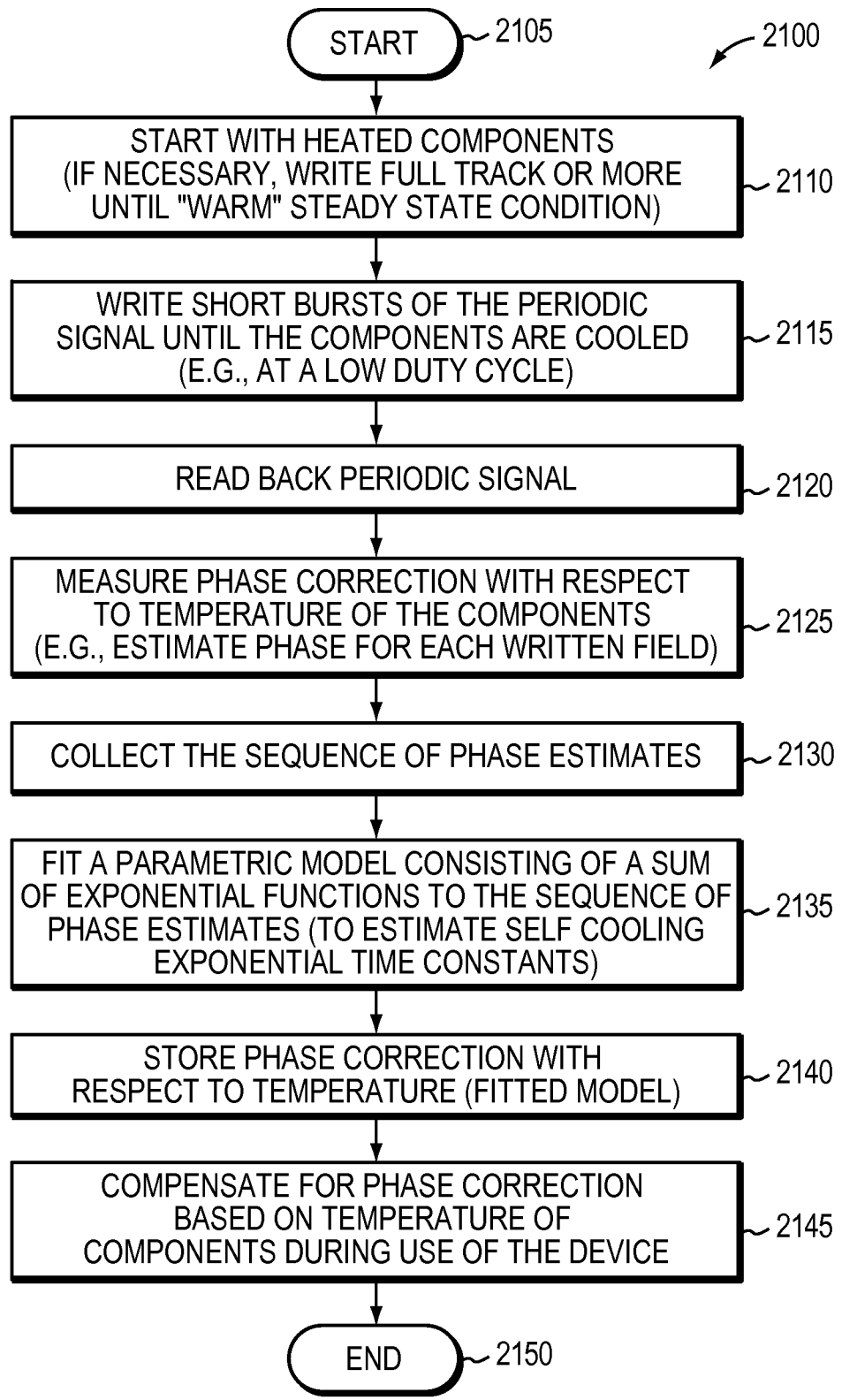
FIG. 21 illustrates a flowchart of an example procedure for determining the effect of self-cooling components.

Alternatively (or in addition), FIG. 21 illustrates an example procedure 2100 for determining the phase correction with respect to self cooling effects of the components according to one or more embodiments herein. In particular, procedure 2100 may begin in step 2105 (e.g., during factory calibration or otherwise), and continue to 2110 by starting with heated components, where, if necessary, a full track or more may be written until the drive is in its "warm" steady state condition. In step 2115, short bursts of the periodic signal (durations of the Vernier pattern at the offset frequency at a low duty cycle) may be written until the components are cooled. These patterns may be written on multiple revolutions of the disk to characterize the cooling time constants, some of which may be longer than a period of revolution (notably, being careful on subsequent revolutions not to overwrite the original patterns).

In step 2120, the periodic signal (track) may be read back, and the phase correction with respect to temperature of the components may be measured in step 2125, estimating the reader-to-writer phase for each written field (short pattern). The sequence of phase estimates may be collected and ordered in step 2130 by the time when the pattern was written, and in step 2135 a parametric model may be fit consisting of a sum of exponential functions to the sequence of phase estimates (to estimate self cooling exponential time constants). Then, in step 2140, the fitted model of phase correction with respect to temperature may be stored for compensation of self cooling effects of device components. As such, in step 2145, the model may be utilized for the compensation during use of the device. The procedure 2100 ends in step 2150.

In addition to compensating for heating and cooling effects, there is also the possibility of calibrating and compensating for the circumferential phase variation of each track. In other words, the phase offset may differ based on the position of the reader/writer 140 within a track, e.g., "repeatable down-track runout" (as opposed to "repeatable cross-track runout," as may be understood by those skilled in the art). Generally, runout refers to deviation along traversal of a track, while "repeatable runout" involves periodic deviations that occur with predictable regularity (often referred to as "RRO"). "Non-repeatable runout," on the other hand, involves random perturbations due, for example, to bearing slop, shock events, and so on. In the context of a disk drive, RRO is "repeatable" because it occurs in sync with the spinning disk. Down-track RRO may be caused by any of the following mechanical sources: a) spindle motor runout; b) disk slippage; c) disk warping; and d) disturbances converted to RRO during a servo writing process due to, for example, non-repeatable runout, vibrations, resonances, media defects, or disk distortion due to clamping of the disk.

In an ideal disk drive system, the tracks of the data storage disk are written as non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, due to the problems mentioned above (e.g., vibration, bearing defects, etc.), tracks are generally written differently from the ideal non-perturbed circular track shape. In order to reduce problems associated with track misplacement, disk drive manufacturers have developed techniques to determine the track misplacement, so that compensation values (also known as embedded runout correction values or ERC values) may be generated and used to correct cross-track RRO. In a similar manner, the phase offset may be predictably altered in response to correct down-track RRO, and the techniques herein may be used to determine such predictable phase offsets, accordingly.

Figure 22:
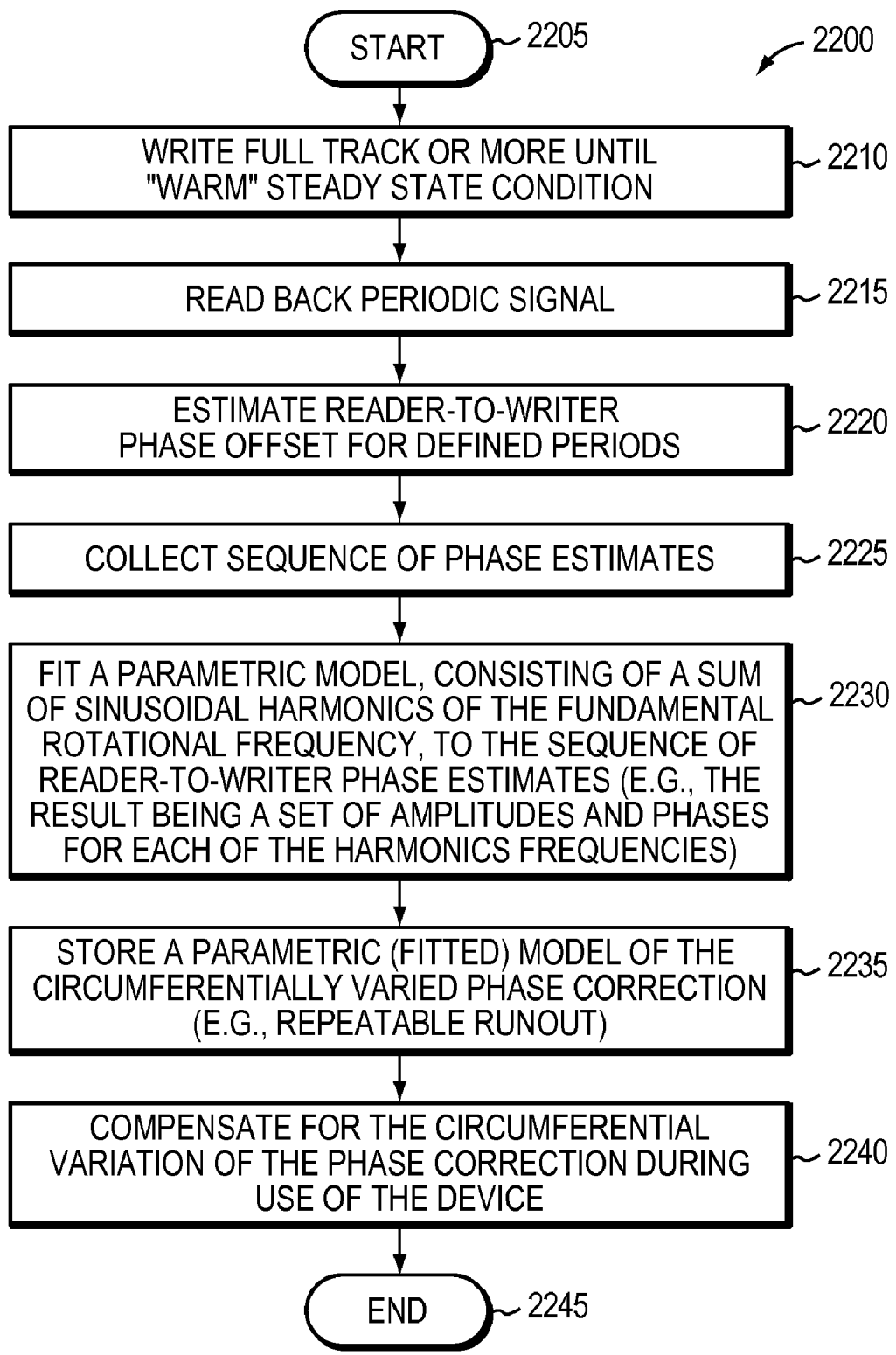
FIG. 22 illustrates a flowchart of an example procedure for compensating for repeatable runout.

FIG. 22 is a flowchart illustrating an example procedure 2200 for estimating circumferential variation and repeatable runout as noted above (e.g., during factory calibrations, or otherwise). Procedure 2200 begins in step 2205, and continues to step 2210, where a full track or more of the periodic Vernier calibration frame may be written until the drive is in its "warm" steady state condition. If necessary, the track may be written twice to ensure that the write channel is in a steady state condition on the second pass. In step 2215, the periodic signal (track) may be read back, and reader-to-writer phase may be estimated in step 2220 for each period of the difference frequency $f_\Delta$, or each M periods, where M is a small number. In step 2225, the sequence of reader-to-writer phase estimates may be collected, which may be used in step 2230 to fit a parametric model consisting of a sum of sinusoidal harmonics of the fundamental rotational frequency to the sequence of reader-to-writer phase estimates. The corresponding result is a set of amplitudes and phases for each of the harmonics frequencies. The fitted parametric model of the circumferentially varied phase correction (e.g., generally and/or based on repeatable runout) may be stored in step 2235, for compensation of the circumferential variation (and thus repeatable runout) for this particular track during use of the device in step 2240. The procedure 2200 ends in step 2245.

Advantageously, the present invention describes calibration techniques that may be used to determine optimal write clock phase for BPM that, during use of the device to ensure and maintain optimal write clock phase, illustratively only requires a single-pass write of a field and a single-pass read operation. As such, once the phase offset has been measured (e.g., based on a determined critical reference point in the field when the reader-to-writer offset is uncertain), this offset can be compensated for within the circuitry that generates the timing signals for writing data to the media. In addition, the techniques described herein advantageously may be used to account for self heating and self cooling effects on the optimal write clock phase and for repeatable variation in dot locations of the patterned media (e.g., both factory calibration), as well as for sub-track skew. Accordingly, the techniques described herein allow for more accurate write clock control for BPM, thus resulting in more effective and efficient use thereof.

While there has been shown and described an illustrative embodiment, it is to be understood that various other adaptations and modifications may be made within the spirit and scope of the present invention. For example, the invention has been shown and described herein for use with particular forms of magnetic media, such as BPM recording in which such positioning is more challenging than with other types of recording. However, it should be understood that the apparatus and method of the present invention are not limited to systems that use BPM, but instead readily apply to a wide variety of magnetic recording techniques (e.g., with discrete track recording, "DTR"). Also, while the invention has been shown using various distances, tolerances, layouts, etc., other values/layouts may be used in accordance the present invention where applicable. Further, various components (e.g., the head controller and timing circuitry) depicted separately may be combined or components depicted individually (e.g., head controller) may consist of several separate components (e.g., processors, controllers, etc.).

In addition, while the above description has shown and illustrated techniques applicable to "reader-before-writer" implementation, it may be appreciated that similar techniques may be applied to "writer-before-reader" implementations, where the writer traverses a field before the reader. In this instance, the phase measurement results may be different, but the techniques used to measure the phase remain substantially the same.

The foregoing description has been directed to specific embodiments of this invention. It will be apparent, however, that other variations and modifications may be made to the described embodiments, with the attainment of some or all of their advantages. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   generating a calibration write clock signal at a frequency offset from a nominal dot frequency of a bit patterned storage media;
   writing a periodic signal synchronous to the calibration write clock signal to the media;
   reading the written periodic signal from the media;
   mixing the read periodic signal with a reference periodic signal at the nominal dot frequency to obtain a difference signal; and
   demodulating the difference signal to determine a phase correction for write synchronization to the media.

2. The method of claim 1, wherein a phase of the written periodic signal either successively advances or successively retards with respect to dots of the media.

3. The method of claim 1, further comprising:
   writing the periodic signal to a calibration field.

4. The method of claim 1, further comprising:
   writing the periodic signal to the calibration write clock signal to the media for at least one frame, a frame being a length over which a phase of the written periodic signal relative to the nominal dot frequency traverses a full cycle of two*pi radians.

5. The method of claim 1, wherein mixing comprises XNORing.

6. The method of claim 1, wherein mixing results in four regions, consisting of:
   I) a first region where dots are written in phase such that the read periodic signal and the reference periodic signal are the same;
   II) a second region where dots are written in quadrature with the reference periodic signal;
   III) a third region where dots are written out of phase such that the read periodic signal and the reference periodic signal are opposite; and
   IV) a fourth region where dots are written in quadrature with the reference periodic signal.

7. The method of claim 6, wherein the phase correction is a difference between a start of the written periodic signal and a center of the first region.

8. The method of claim 1, wherein demodulating comprises:
   utilizing a discrete Fourier transform (DFT) phase demodulation of the difference signal.

9. The method of claim 1, further comprising:
   using a phase interpolator to generate the write clock at the frequency offset.

10. The method of claim 1, further comprising:
    determining the phase correction during at least one of either factory calibration and use of the device.

11. The method of claim 1, further comprising:
    determining the phase correction with respect to self heating effects of components corresponding to a device housing the media.

12. The method of claim 11, further comprising:
    starting with unheated components;
    writing a long periodic signal until the components are heated;
    measuring phase correction with respect to temperature of the components;
    storing phase correction with respect to temperature; and
    compensating for phase correction based on temperature of components during use of the device.

13. The method of claim 1, further comprising:
    determining the phase correction with respect to self cooling effects of components corresponding to a device housing the media.

14. The method of claim 13, further comprising:
    starting with heated components;
    writing short bursts of the periodic signal until the components are cooled;
    measuring phase correction with respect to temperature of the components;
    storing phase correction with respect to temperature; and
    compensating for phase correction based on temperature of components during use of the device.

15. The method of claim 1, wherein periodic signals are all selected from a group consisting of: "++−−" or "−−++" or "+−−+" or "−++−".

16. The method of claim 1, wherein periodic signals are all square waves.

17. The method of claim 1, wherein the reference periodic signal has a period T, and wherein the frequency offset is generated by successively advancing or retarding phase by m/n T.

18. The method of claim 17, wherein the frequency offset is selected from 1/31 T, 1/63 T, or 1/127 T.

19. The method of claim 1, wherein the bit patterned storage media comprises staggered even and odd sub-tracks, the method further comprising:
    determining a sub-track skew based on the difference signal.

20. The method of claim 19, further comprising:
    determining the sub-track skew by demodulating the difference signal to obtain a ratio of an amplitude of a third harmonic of the difference signal to an amplitude of a fundamental harmonic of the difference signal.

21. The method of claim 1, further comprising:
   writing a synchronization field prior to the written periodic signal; and
   determining a start of the written periodic signal based on the written synchronization field.

22. The method of claim 21, wherein the phase correction is based on the start of the written periodic signal.

23. The method of claim 1, further comprising:
   determining the phase correction with respect to circumferential variation of the phase correction for a circumferential track of the media.

24. The method of claim 23, further comprising:
   storing a parametric model of the circumferentially varied phase correction; and
   compensating for the circumferential variation of the phase correction during use of the device.

25. The method of claim 1, wherein a single write operation and a single read operation are performed.

26. An apparatus, comprising:
   a write clock generator configured to generate a calibration write clock signal at a frequency offset from a nominal dot frequency of a bit patterned storage media; and
   a write clock phase correction module configured to:
      i) determine a read periodic signal that was written to the media synchronous to the calibration write clock signal,
      ii) obtain a difference signal by mixing the read periodic signal with a reference periodic signal at the nominal dot frequency, and
      iii) demodulate the difference signal to determine a phase correction for write synchronization to the media.

27. The apparatus of claim 26, further comprising: XNOR logic to mix the read periodic signal with the reference periodic signal at the nominal dot frequency.

28. The apparatus of claim 26, wherein mixing results in four regions, consisting of:
   I) a first region where dots are written in phase such that the read periodic signal and the reference periodic signal are the same;
   II) a second region where dots are written in quadrature with the reference periodic signal;
   III) a third region where dots are written out of phase such that the read periodic signal and the reference periodic signal are opposite; and
   IV) a fourth region where dots are written in quadrature with the reference periodic signal.

29. The apparatus of claim 28, wherein the phase correction is a difference between a start of the written periodic signal and a center of the first region.

30. The apparatus of claim 26, wherein demodulation comprises utilization of a discrete Fourier transform (DFT) phase demodulation of the difference signal.

31. The apparatus of claim 26, further comprising:
   a phase interpolator configured to generate the write clock at the frequency offset.

32. The apparatus of claim 26, wherein the bit patterned storage media comprises staggered even and odd sub-tracks, the write clock phase correction module further configured to determine a sub-track skew based on the difference signal.

33. The apparatus of claim 32, wherein the write clock phase correction module further configured to determine the sub-track skew by demodulation of the difference signal to obtain a ratio of an amplitude of a third harmonic of the difference signal to an amplitude of a fundamental harmonic of the difference signal.

34. The apparatus of claim 26, wherein the write clock phase correction module is further configured to determine a start of the written periodic signal based on a synchronization field prior to the written periodic signal, and wherein the phase correction is based on the start of the written periodic signal.

35. The apparatus of claim 26, wherein the write clock phase correction module is further configured to determine the phase correction with respect to circumferential variation of the phase correction for a circumferential track of the media, store a parametric model of the circumferentially varied phase correction, and compensate for the circumferential variation of the phase correction.

36. An apparatus, comprising:
   a bit patterned storage media having a nominal dot frequency;
   a write clock generator configured to generate a calibration write clock signal at a frequency offset from the nominal dot frequency;
   a write head configured to write a periodic signal synchronous to the calibration write clock signal to the media;
   a read head configured to read the written periodic signal from the media; and
   a write clock phase correction module configured to i) mix the read periodic signal with a reference periodic signal at the nominal dot frequency to obtain a difference signal, and ii) demodulate the difference signal to determine a phase correction for write synchronization to the media.

37. The apparatus of claim 36, wherein a phase of the written periodic signal either successively advances or successively retards with respect to dots of the media.

38. The apparatus of claim 36, wherein the periodic signal synchronous to the calibration write clock signal is written to the media for at least one frame, a frame being a length over which a phase of the written periodic signal relative to the nominal dot frequency traverses a full cycle of two*pi radians.

39. The apparatus of claim 36, wherein the write clock phase correction module comprises XNOR logic to mix the read periodic signal with the reference periodic signal at the nominal dot frequency.

40. The apparatus of claim 36, wherein mixing results in four regions, consisting of:
   I) a first region where dots are written in phase such that the read periodic signal and the reference periodic signal are the same;
   II) a second region where dots are written in quadrature with the reference periodic signal;
   III) a third region where dots are written out of phase such that the read periodic signal and the reference periodic signal are opposite; and
   IV) a fourth region where dots are written in quadrature with the reference periodic signal.

41. The apparatus of claim 40, wherein the phase correction is a difference between a start of the written periodic signal and a center of the first region.

42. The apparatus of claim 36, wherein demodulation comprises utilization of a discrete Fourier transform (DFT) phase demodulation of the difference signal.

43. The apparatus of claim 36, further comprising: a phase interpolator configured to generate the write clock at the frequency offset.

44. The apparatus of claim 36, wherein the write clock phase correction module is further configured to determine the phase correction with respect to at least one of either self heating or self cooling effects of components corresponding to the apparatus.

45. The apparatus of claim 44, wherein the write clock phase correction module is configured to determine the phase correction with respect to at least one of either self heating or self cooling effects of components corresponding to the apparatus by heating and cooling the apparatus, respectively, and measuring phase correction with respect to temperature of the apparatus and whether the apparatus is heating or cooling, respectively.

46. The apparatus of claim 36, wherein the bit patterned storage media comprises staggered even and odd sub-tracks, the write clock phase correction module further configured to determine a sub-track skew based on the difference signal.

47. The apparatus of claim 46, wherein the write clock phase correction module is configured to determine the sub-track skew by demodulation of the difference signal to obtain a ratio of an amplitude of a third harmonic of the difference signal to an amplitude of a fundamental harmonic of the difference signal.

48. The apparatus of claim 36, wherein the write clock phase correction module is further configured to determine a start of the written periodic signal based on a synchronization field prior to the written periodic signal, and wherein the phase correction is based on the start of the written periodic signal.

49. The apparatus of claim 36, wherein the write clock phase correction module is further configured to determine the phase correction with respect to circumferential variation of the phase correction for a circumferential track of the media.

50. The apparatus of claim 49, wherein the write clock phase correction module is further configured to store a parametric model of the circumferentially varied phase correction, and compensate for the circumferential variation of the phase correction during use of the apparatus.

* * * * *